United States Patent

Ohtaka et al.

[11] Patent Number: 5,839,001
[45] Date of Patent: Nov. 17, 1998

[54] FOCUS DETECTING APPARATUS

[75] Inventors: Keiji Ohtaka; Yasuo Suda; Keiji Nagata, all of Yokohama; Kenichiro Yamashita, Matsudo; Terutake Kadohara; Hitoshi Onoda, both of Yokohama, all of Japan

[73] Assignee: Canon Kabushiki Kaisha, Tokyo, Japan

[21] Appl. No.: 777,952

[22] Filed: Dec. 23, 1996

[30] Foreign Application Priority Data

Dec. 28, 1995 [JP] Japan .................................. 7-354103
Dec. 28, 1995 [JP] Japan .................................. 7-354104
Dec. 28, 1995 [JP] Japan .................................. 7-354105

[51] Int. Cl.⁶ .................................................. G03B 13/36
[52] U.S. Cl. .......................................... 396/114; 396/272
[58] Field of Search ................................... 396/111, 114, 396/268, 272, 354

[56] References Cited

U.S. PATENT DOCUMENTS

| 4,147,417 | 4/1979 | Mandler | 354/25 |
| 4,555,169 | 11/1985 | Suda et al. | 354/407 |
| 5,212,514 | 5/1993 | Goto | 354/402 |

FOREIGN PATENT DOCUMENTS

| 0 440 170 A1 | 8/1991 | European Pat. Off. . |
| 29 09 877 A1 | 9/1977 | Germany . |
| 61-15112 | 1/1986 | Japan . |
| 62-173412 | 7/1987 | Japan . |

OTHER PUBLICATIONS

Patent Abstracts of Japan, Kuraska Yosuke, Publication, No. 02–143211, published Jan. 1990, for application No. 63–297342, Filed Nov. 1988, "Focus Detecting Device".

Primary Examiner—W. B. Perkey
Attorney, Agent, or Firm—Fitzpatrick, Cella, Harper & Scinto

[57] ABSTRACT

An apparatus which has a finder optical unit for observing therethrough an image formed by an objective lens, an optical unit for forming a pair of distributions of light quantity on the basis of light beams transmitted through the different pupils of the objective lens, a sensor unit for receiving the pair of distributions of light quantity, a main mirror disposed in an optical path leading to the objective lens and the optical unit for reflecting the light beam from the objective lens to the finder optical unit, and a reflecting mirror having a curved surface having its concave surface facing the light incidence side for reflecting the light beam transmitted through the main mirror in the direction of the optical unit which is opposite to the finder optical unit, and which well makes focus detection possible for a wide field area formed by the objective lens.

7 Claims, 20 Drawing Sheets

FOCUS DETECTING APPARATUS

BACKGROUND OF THE INVENTION

1. Field of the Invention

This invention relates to a focus detecting apparatus suitable for use in a photographic camera, a video camera, an observation apparatus, etc., and to an optical apparatus using the same, and is particularly suitable when dividing the pupil of an objective lens (a photo-taking lens) into a plurality of areas, forming distributions of light quantity regarding a plurality of object images by the use of light beams passing through the respective areas, and finding the relative positional relation between the plurality of distributions of light quantity to thereby two-dimensionally or continuously detect the in-focus state of the objective lens relative to the plurality of areas over a wide area in a photographing range.

2. Related Background Art

Focus detecting systems of the light receiving type utilizing a light beam passed through an objective lens include a system called an image deviation system (a phase difference detecting system).

FIG. 7 of the accompanying drawings is a schematic view of the optical system (optical apparatus) of a focus detecting apparatus using the conventional art image deviation system. In FIG. 7, the reference numeral 101 designates an objective lens (a phototaking lens) for effecting photographing, the reference numeral 102 denotes a half-transmitting main mirror, the reference numeral 103 designates a focusing screen, the reference numeral 104 denotes a pentagonal prism, the reference numeral 105 designates an eyepiece, the reference numeral 106 denotes a sub-mirror, the reference numeral 107 designates film (a photosensitive surface), and the reference numeral 108 denotes a focus detecting apparatus.

In FIG. 7, a light beam from an object, not shown, is transmitted through the objective lens 101, whereafter it is upwardly reflected by the main mirror 102 and forms an object image on the focusing screen 103. The object image formed on the focusing screen 103 is visually confirmed by a photographer or an observer through the eyepiece 105 via several times of reflection by the pentagonal prism 104.

On the other hand, part of the light beam which has passed through the objective lens 101 to the main mirror 102 is transmitted through the transmitting portion of the main mirror 102, is downwardly reflected by the sub-mirror 106 and is guided to the focus detecting apparatus 108.

FIG. 8 of the accompanying drawings is an illustration in which only the objective lens 101 and focus detecting apparatus 108 in FIG. 7 are taken out and developed to illustrate the principle of focus detection.

In the focus detecting apparatus 108 of FIG. 8, the reference numeral 109 designates a field mask disposed near the predetermined focal plane of the objective lens 101, i.e., a plane conjugate with the film surface 107, the reference numeral 110 denotes a field lens disposed also near the predetermined focal plane, the reference numeral 111 designates a secondary imaging system comprising two lenses 111-1 and 111-2, the reference numeral 112 denotes a photoelectrical changing element including two sensor arrays 112-1 and 112-2 disposed correspondingly to and rearwardly of the two lenses 111-1 and 111-2, the reference numeral 113 designates an aperture having two opening portions 113-1 and 113-2 disposed correspondingly to the two lenses 111-1 and 111-2, and the reference numeral 114 denotes the exit pupil of the objective lens 101 including two divided areas 114-1 and 114-2.

The field lens 110 has the function of imaging the opening portions 113-1 and 113-2 of the aperture 113 near the areas 114-1 and 114-2 in the exit pupil 114 of the objective lens 101, and light beams (flux) 115-1 and 115-2 transmitted through the areas 114-1 and 114-2 of the exit pupil 114 may form distributions of light quantity regarding the object image on the two sensor arrays 112-1 and 112-2.

The focus detecting apparatus shown in FIG. 8 is what is generally called a phase difference detection system (an image deviation system), and when the imaging point of the objective lens 101 is on the front side of the predetermined focal plane, i.e., on the objective lens 101 side, the distributions of light quantity regarding the object images formed on the two sensor arrays 112-1 and 112-2 become close to each other, and when conversely, the imaging point of the objective lens 101 is on the rear side of the predetermined focal plane, i.e., on the side opposite to the objective lens 101, the distributions of light quantity regarding the object images formed on the two sensor arrays 112-1 and 112-2 become far from each other.

Moreover, the amount of deviation of the distributions of light quantity regarding the object images formed on the two sensor arrays 112-1 and 112-2 is in a certain functional relation with the defocus amount, i.e., the off-focus amount, of the objective lens 101 and therefore, by calculating the amount of deviation by suitable calculating means, the direction and amount of off-focus of the objective lens 101 are detected.

In an optical apparatus incorporating therein the conventional art focus detecting apparatus shown in FIG. 7, a light beam necessary for focus detection is guided to the focus detecting apparatus 108 via the sub-mirror 106. Therefore, the range of an area in the photographing range in which focus detection is possible is restricted by the size (area) of the sub-mirror 106. The sub-mirror 106 has been particularly difficult to enlarge upwardly from its disposition relation with the main mirror 102 and accordingly, it has been impossible to enlarge the area in which focus detection is possible upwardly above the film 107, i.e., downwardly on the object side.

In FIG. 7, to make the area of the sub-mirror 106 large without interfering with the main mirror 102, it would occur to mind to move the sub-mirror 106 rearwardly. In such a case, however, the position of the predetermined focal plane of the objective lens 101 formed after being reflected by the sub-mirror 106 moves upwardly and therefore, the distance between the predetermined focal plane and the focus detecting system 108 becomes great, and it is necessary to make the field lens in the focus detecting apparatus 108 (the field lens 110 of FIG. 7) considerably large. This becomes a great hindrance in disposing the focus detecting system at the bottom of a camera.

In order that the field lens may not become large relative to the upwardly moved predetermined focal plane, the field lens can be upwardly moved in accordance with the predetermined focal plane, but if this is done, the field lens will intercept the photographing light beam and thus, during photographing, it is necessary to retract the field lens out of the phototaking light beam. To realize this, the mechanical structure becomes very complicated and costly and moreover, it becomes difficult to maintain the accuracy equal to that of the conventional art focus detecting apparatus.

On the other hand, chiefly, a line sensor is used as the photoelectrical changing element used in the conventional art focal detecting apparatus, and the area in which focus detection is substantially possible has been merely a very much limited area such as a point or a line in the photographing range.

Some of the conventional art focus detecting apparatuses have a plurality of focus detecting systems so as to enable focus detection to be accomplished in a plurality of areas, but the respective focus detection areas have been isolated from each other and focusing could not be effected on an object lying in the intermediate portion of each focus detection area.

SUMMARY OF THE INVENTION

It is an object of the present invention to provide a focus detecting apparatus in which each of optical means for focus detection provided on the image plane side of an objective lens (a photo-taking lens) is appropriately set, whereby in any area and/or a plurality of areas in vertical and horizontal directions in a photographing field, an area in which focus detection is possible can be extended particularly to the upper portion in a phototaking range and focus detection can be highly accurately effected also at any point in a continuous two-dimensional area, and an optical apparatus using the same.

It is another object of the present invention to overcome a disadvantage peculiar to a focus detecting apparatus of the phase difference type which cannot effect focus detection for an object having a density distribution only in a direction orthogonal to a direction for detecting a phase difference which is an image deviation detection direction, and to provide a focus detecting apparatus which, in a two-dimensional area, can effect focus detection irrespective of the direction of the density distribution of an object and makes focus detection possible in any two-dimensional area in a photographing range and yet can select the optimum focus detection accuracy in conformity with the brightness of an objective lens, and an optical apparatus using the same.

The focus detecting apparatus of the present invention has:

a finder optical unit for observing therethrough an image formed by the objective lens;

an optical unit for forming a pair of distributions of light quantity on the basis of light beams transmitted through the different pupils of the objective lens;

a pair of sensor units for receiving the pair of distributions of light quantity;

a main mirror disposed in an optical path leading to the objective lens and the optical unit for reflecting the light beam from the objective lens to the finder optical unit; and a reflecting mirror having a curved surface having its concave surface facing the light incidence side for reflecting the light beam transmitted through the main mirror in a direction opposite to the finder optical unit; or an optical unit for forming a pair of distributions of light quantity on the basis of light beams transmitted through the different pupils of the objective lens;

a sensor unit for receiving the pair of distributions of light quantity; and a reflecting member disposed between the objective lens and the optical unit for directing the light beam from the objective lens to the optical unit, the reflecting member having a reflecting surface which does not have a rotation symmetry axis. Particularly, the optical unit forms a plurality of pairs of distributions of light quantity.

It further has a finder optical unit for observing therethrough the image of the objective lens, and a main mirror disposed between the objective lens and the reflecting member, the main mirror reflecting the light beam from the objective lens to the main mirror, the reflecting member reflecting the light from the objective lens in a direction opposite to the finder.

DESCRIPTION OF THE PREFERRED EMBODIMENTS

Figure 1:
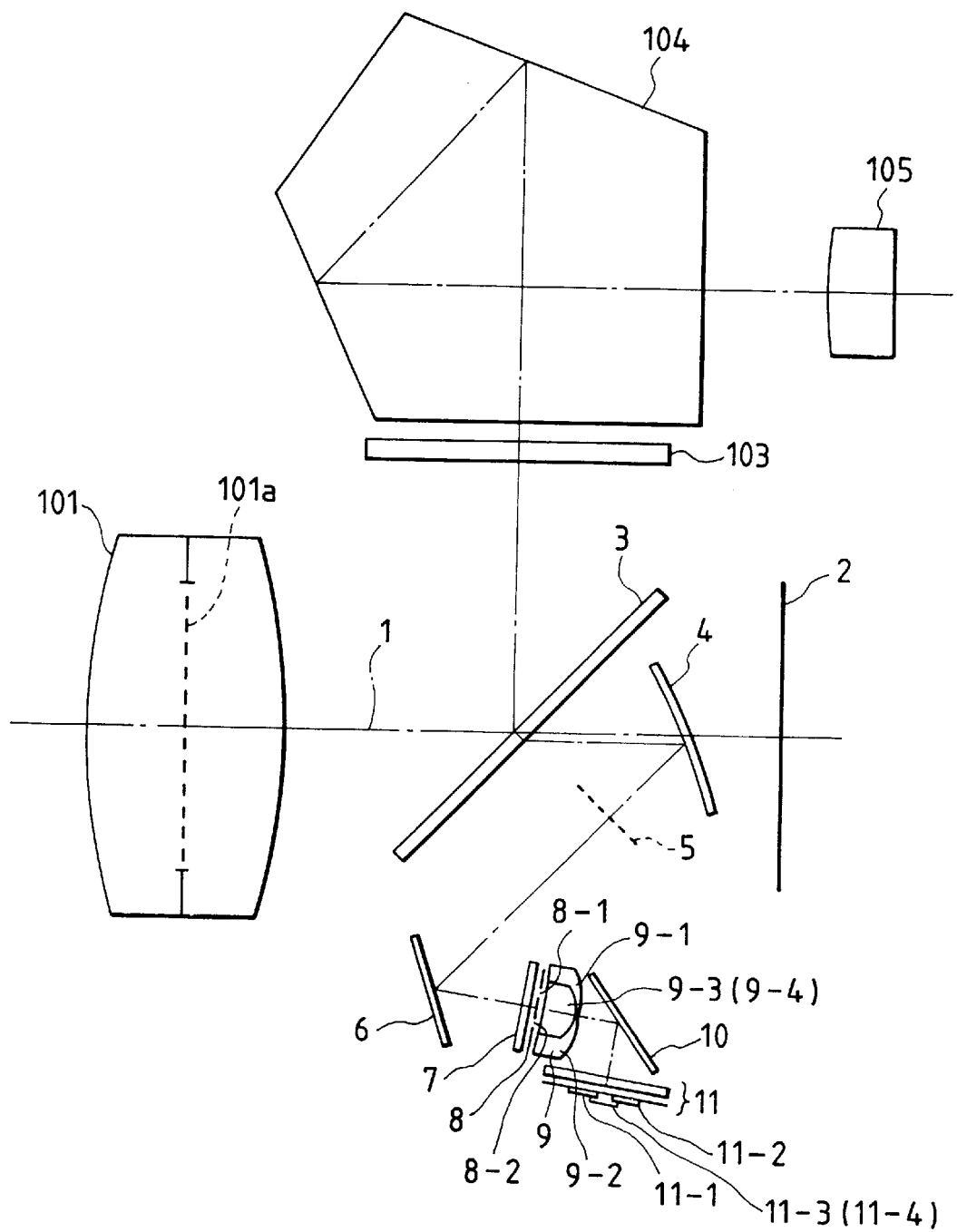
FIG. 1 is a schematic view of the essential portions of Embodiment 1 of the present invention.
Figure 2:
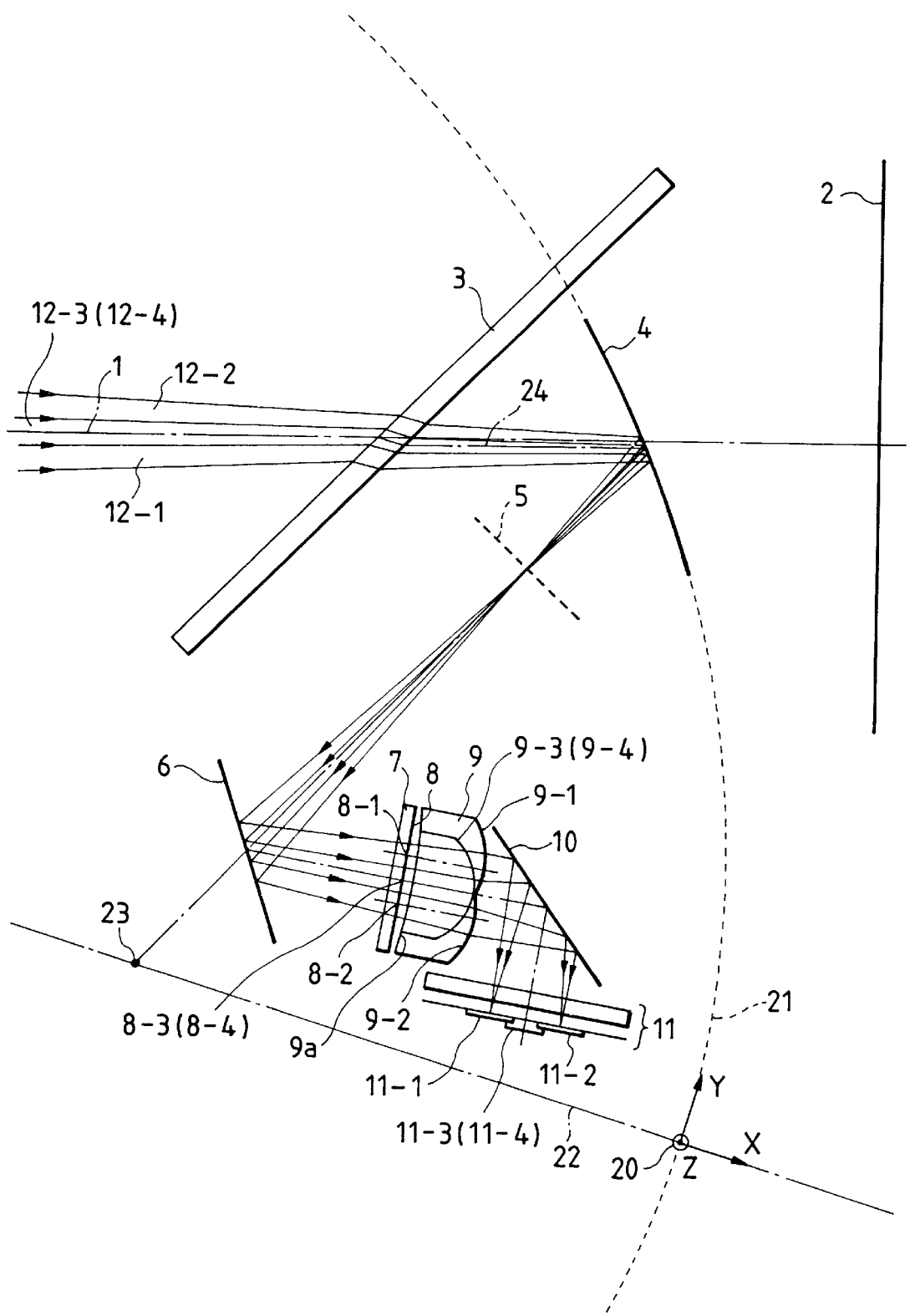
FIG. 2 is an enlarged illustration of a portion of the focus detecting apparatus of FIG. 1.

FIG. 1 is a schematic view of the essential portions of Embodiment 1 in which the focus detecting apparatus of the present invention is applied to an optical apparatus such as a camera, and FIG. 2 is a schematic view of essential portions constituting the focus detecting apparatus of FIG. 1.

In FIG. 1, the reference numeral 101 designates an objective lens, the reference numeral 1 denotes the optical axis of the objective lens 101, the reference numeral 2 designates a film (image pickup surface), the reference numeral 3 denotes a half-transmitting main mirror disposed on the optical axis 1 of the objectivelens 101, and the reference numeral 103 designates a focusing screen on which an object image by the objective lens 101 is formed through the main mirror 3. The reference numeral 104 denotes a pentagonal prism, and the reference numeral 105 designates an eyepiece through which the object image on the focusing screen 103 is observed.

The reference numeral 4 denotes a first reflecting mirror disposed obliquely relative to the optical axis 1 on the image plane side of the objective lens 101, and comprising a light condensing concave mirror or an elliptical surface mirror or the like. The reference numeral 5 designates a paraxial imaging plane by the first reflecting mirror 4 which is conjugate with the film 2 and on which the object image is formed. The reference numeral 6 denotes a second reflecting mirror, the reference numeral 7 designates an infrared cut filter, the reference numeral 8 denotes an aperture having four openings 8-1, 8-2, 8-3 and 8-4, the reference numeral 9 designates a secondary imaging system having four lenses 9-1, 9-2, 9-3 and 9-4 disposed correspondingly to the four openings 8-1, 8-2, 8-3 and 8-4 in the aperture 8, the reference numeral 10 denotes a third reflecting mirror, and the reference numeral 11 designates a photoelectrical changing element (light receiving means) having four area sensors 11-1, 11-2, 11-3 and 11-4. The first reflecting mirror 4, the second reflecting mirror 6 and the secondary imaging system 9 each constitute an element of optical means.

The lenses 9-1 and 9-2 together constitute a pair of lens portions, and the lenses 9-3 and 9-4 together constitute a pair of lens portions. In the present embodiment, three or more pairs of lens portions may be provided and the other elements may be constituted in conformity therewith.

The first reflecting mirror 4 in the present embodiment has a light condensing curvature and is adapted to project the four openings 8-1, 8-2, 8-3 and 8-4 in the aperture 8 onto the vicinity of the exit pupil 101a of the objective lens 101.

Also, the first reflecting mirror 4 has a metallic film such as aluminum or silver deposited by evaporation thereon so that only the necessary portion thereof may reflect light, and serves also as a field mask (regulating means) for limiting a range in which focus detection is effected. On the other reflecting mirrors 6 and 10 as well, only necessary minimum areas are deposited by evaporation for light reflection in order to decrease stray light incident on the photoelectrical changing element 11. Each reflecting mirror has applied thereto regulating means such as applying a light absorbing paint or the like to an area thereof which does not function as a reflecting surface, or providing a light intercepting member in proximity thereto.

Figure 3:
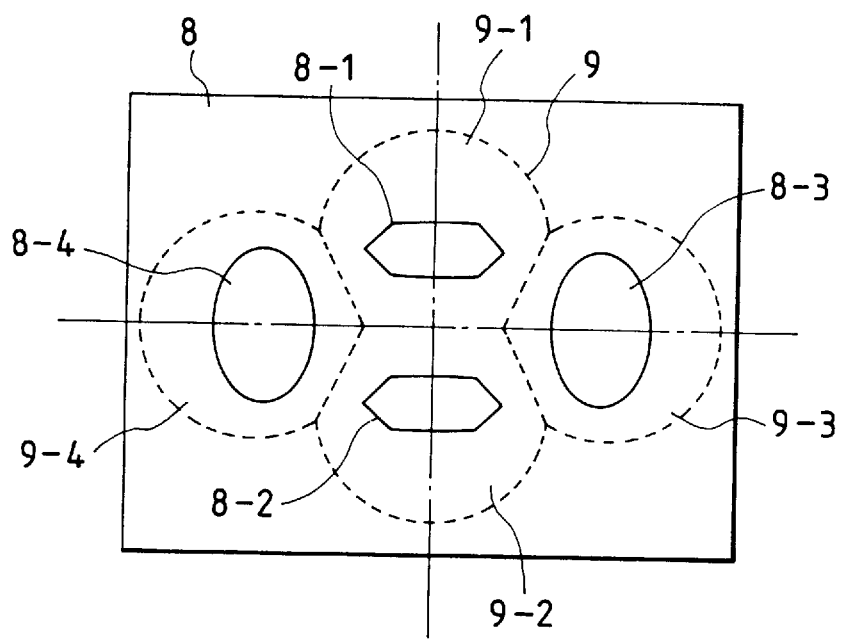
FIG. 3 is an illustration showing the aperture and secondary imaging system of FIG. 1.

FIG. 3 is a plan view of the aperture 8 of FIG. 1. The aperture 8 is of such a construction that laterally long two openings 8-1 and 8-2 are arranged in a direction of a narrow opening width (a vertical direction in the phototaking range) and vertically long two openings 8-3 and 8-4 are arranged in the left to right direction (horizontal direction) in the photographing range. What are indicated by dotted lines in FIG. 3 are the lenses 9-1, 9-2, 9-3 and 9-4 of the secondary imaging system 9 which are disposed correspondingly to and rearwardly of the openings 8-1, 8-2, 8-3 and 8-4 in the aperture 8.

In the present embodiment, the openings 8-3 and 8-4 in the aperture 8 are disposed more outside than the openings 8-1 and 8-2 so as to introduce the light in the area around the pupil of the objective lens 101. By adopting such a construction, the so-called base line length during focus detection is made greater.

The focus detecting system by the openings 8-3 and 8-4 in the aperture 8 can enhance focus detection accuracy for an objective lens of bright F-number. Of course, it is also possible to make the positions from the center at which the openings 8-3 and 8-4 in the aperture 8 are disposed the same as those for the openings 8-1 and 8-2, and construct them so as to enable focus detection to be always effected for an object for which the focus detection accuracy is equal but which has a density distribution only in one of the vertical and horizontal directions, irrespective of the brightness of the objective lens.

Also, the openings 8-1, 8-2 and openings 8-3, 8-4 in the aperture 8 differ in shape from each other, and the directions of separation thereof are orthogonal to each other and the distances of separation thereof differ from each other.

Figure 4:
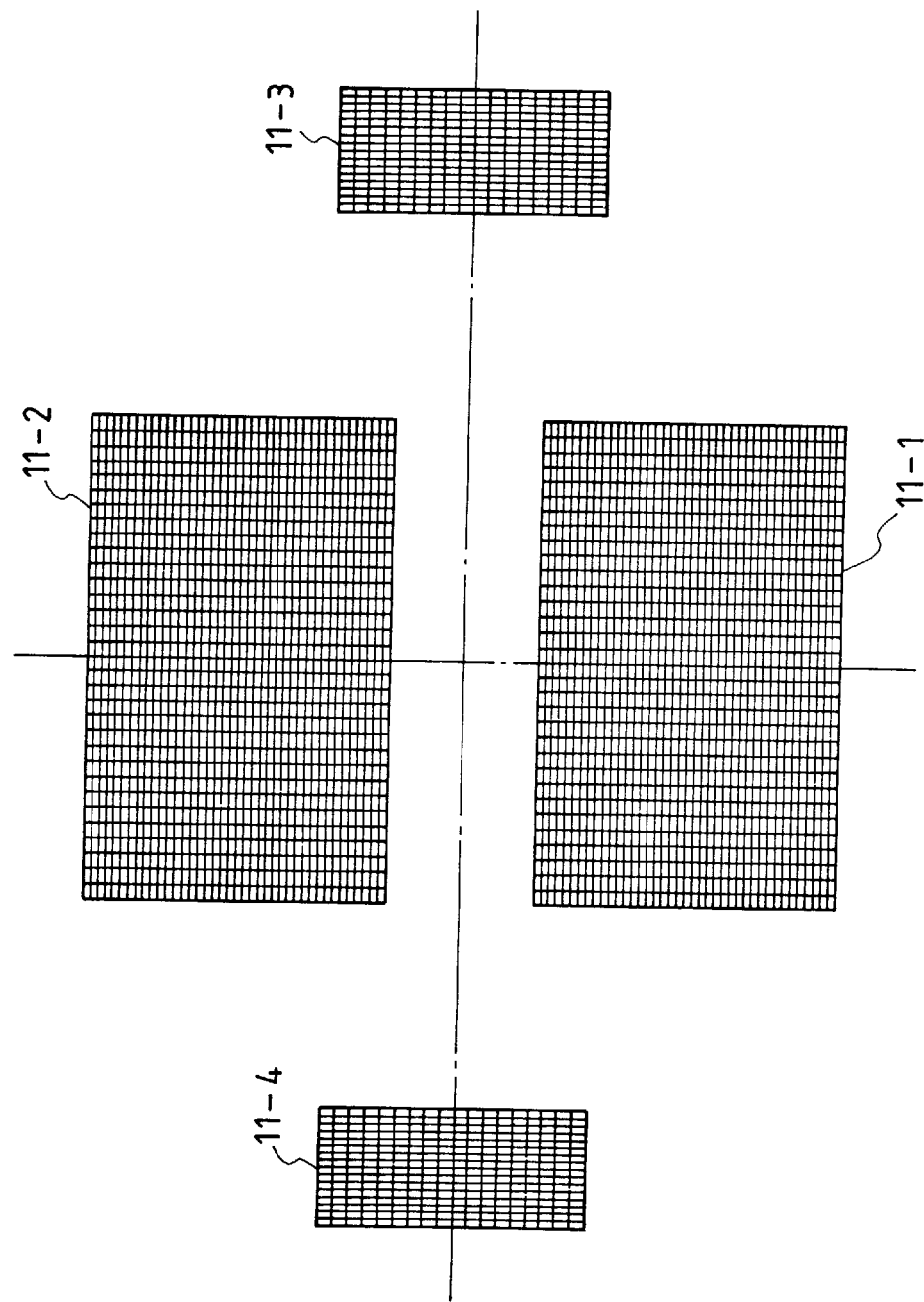
FIG. 4 is an illustration showing the photoelectric conversion element of FIG. 1.

FIG. 4 is a plan view of the photoelectric conversion element 11, and as shown in this figure, the four area sensors 11-1, 11-2, 11-3 and 11-4 shown in FIG. 1 are four area sensors 11-1, 11-2, 11-3 and 11-4 in which a plurality of pixels are two-dimensionally arranged.

In the above-described construction, four light beams (flux) 12-1, 12-2, 12-3 and 12-4 of FIG. 2 from the phototaking lens 101 of FIG. 1 are transmitted through the main mirror 3, whereafter, they are reflected in a direction substantially along the inclination of the main mirror 3 by the first reflecting mirror 4, and form an object image on the paraxial imaging plane 5. At this time, the first reflecting mirror 4 reducingly forms on the paraxial imaging plane 5 the object image formed on the image pickup surface 2. The light beam from the object image formed on the paraxial imaging plane 5 is reflected by the second reflecting mirror 6 and changes its direction again, whereafter, it is condensed by the lenses 9-1, 9-2, 9-3 and 9-4 of the secondary imaging system 9 via the infrared cut filter 7 and the four openings 8-1, 8-2, 8-3 and 8-4 in the aperture 8, and arrives at the area sensors 11-1, 11-2, 11-3 and 11-4 of the photoelectric conversion element 11 via the third reflecting mirror 10.

The light beams 12-1, 12-2, 12-3 and 12-4 in FIG. 2 indicate light beams imaged at the center of the film 2, but light beams imaged at other positions arrive at the photo-electrical changing element 11 via a similar route and, as a whole, four distributions of light quantity regarding the object image are formed on the area sensors 11-1, 11-2, 11-3 and 11-4 of the photoelectrical changing element 11 corresponding to predetermined two-dimensional areas on the film (in the photographing range) 2.

In the present embodiment, the first reflecting mirror 4 is constructed of a part of a curved surface formed by a quadratic curve being rotated about an axis, and particularly, a spheroidal surface is suitably used. In FIG. 2, the surface shape of the first reflecting mirror 4 comprises a part of a spheroidal surface formed by an ellipse 21 having a point 20 as its vertex being rotated about an axis 22, and the focus thereof is set near the central image position 23 on the aperture 8 by the second reflecting mirror 6 and near a point (not shown) on the extension of an optical axis 24 after the transmission through the main mirror 3. The exit pupil position of the objective lens 101 and the entrance position of the secondary imaging system 9 may be substantially imaged in such a manner that the point on the extension of the optical axis 24 is near the exit pupil position of the objective lens 101 (when various objective lenses are interchangeably used, their average exit pupil position).

Thereby, the first reflecting mirror 4 is adapted to function as an ideal field lens. As is apparent from FIG. 2, what is optically used as the first reflecting mirror 4 is an area which does not include the rotational axis and vertex of the spheroidal surface.

The specific shape of the spheroidal surface 4 in the present embodiment can be represented, relative to the coordinate axes of FIG. 2, as follows:

$$x = \frac{h^2/r}{1 + \sqrt{1 - (1-k)(h/r)^2}} \quad (h^2 = y^2 + z^2)$$

r=−38.5 k=−0.37

Supposing an ordinary camera (optical apparatus) and an ordinary objective lens (photo-taking lens), the ranges of r and k may preferably be of the order of on −20≦r≦−50 and −1≦k≦−0.2.

Also, in the present embodiment, the entrance side surface (first surface) 9a of the secondary imaging system 9 is made into a concave surface shape to thereby provide such a lens construction that light entering the secondary imaging system 9 is not forcibly refracted, and good and uniform imaging performance is achieved over the wide range of the two-dimensional area on the photoelectrical changing element 11.

For the four distributions of light quantity regarding the object image obtained in this manner, on the basis of a principle similar to that described as the focus detecting method of the image deviation type according to the conventional art, the relative positional relation in the direction of separation, i.e., the vertical direction of the two area sensors 11-1 and 11-2 shown in FIG. 4, is calculated at positions comprising any plurality of elements of the area sensors 11-1 and 11-2, or the relative positional relation in the horizontal direction of the two area sensors 11-3 and 11-4 is calculated at the positions of the area sensors 11-3 and 11-4, whereby the focus state of the objective lens 101 is two-dimensionally detected in any area in the phototaking range. The first reflecting mirror 4 is retracted out of the photographing optical path like the main mirror 3, during phototaking.

What should be noted here is the distortion of the object images on the paraxial imaging plane 5 and the photoelectrical changing element 11 resulting from the imaging of the first reflecting mirror 4. As previously described, the first reflecting mirror 4 has convergent power which projects the four openings 8-1, 8-2, 8-3 and 8-4 in the aperture 8 near the exit pupil 101a of the objective lens 101, and is provided obliquely with respect to the optical axis 1 and therefore, asymmetrical great distortion is created on the imaging plane 5 thereof.

Figure 5:
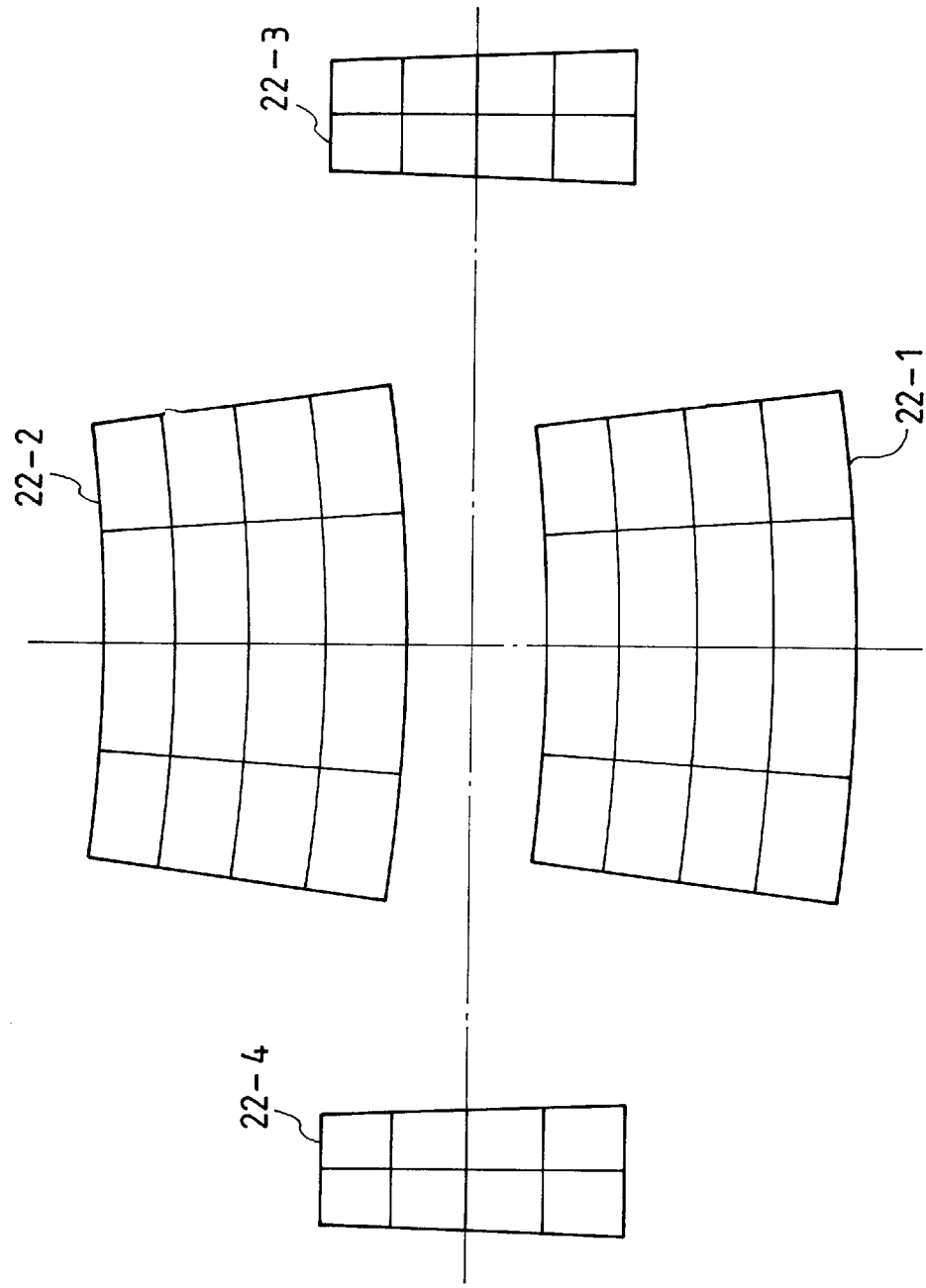
FIG. 5 is an illustration showing the distortion of an image on the imaging plane of FIG. 1.
Figure 12:
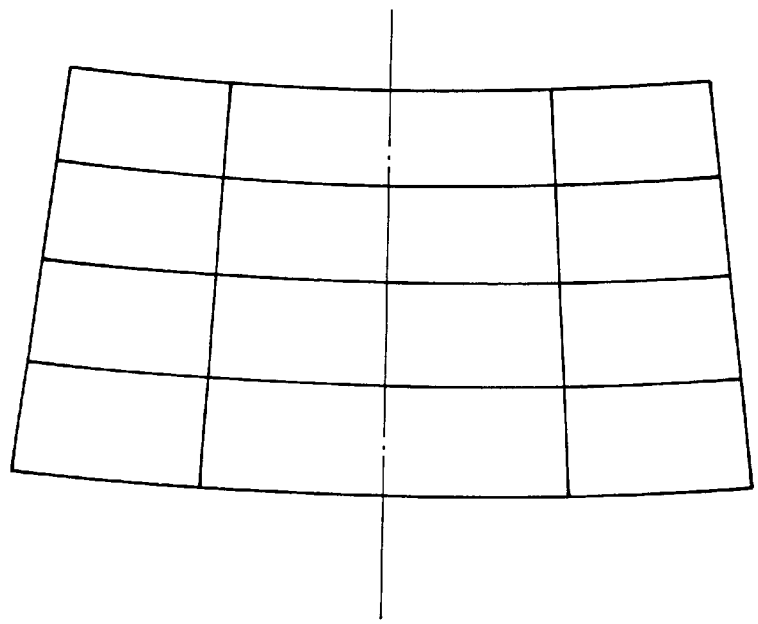
FIG. 12 is an illustration showing the distortion of an image on the imaging plane of a reflecting mirror in the embodiment of the present invention.

FIG. 12 is a plan view showing how distortedly rectangular checked figures are imaged on the imaging plane 5 in FIG. 2 by the first reflecting mirror 4 in the present embodiment when the rectangular checked figures are imaged on the film 2 by the objective lens 101, and the upper portion of FIG. 5 is the main mirror 3 side of FIG. 2.

In the present embodiment, in order to suppress the generation of such a distortion of the image to the utmost, the design is made such that the angle formed by the normal at the point of intersection with the optical axis 24 of the first reflecting mirror 4 and the optical axis 24 is made as small as possible and the reflected light beam is reflected in a direction substantially along the main mirror 3, i.e., as forwardly as possible. Accordingly, the angle formed by the ray of light incident along the optical axis and the reflected ray of light thereof is an acute angle. The second reflecting mirror 6 is provided to direct the forwardly reflected light beam to the secondary imaging system 9.

As shown in FIG. 12, the figures rectangularly formed on the film 2 are imaged in a sector narrow at its upper portion and wide at its lower portion on the imaging plane 5 by the first reflecting mirror 4. Thus, if they are reimaged in this state on the photoelectrical changing element 11 by the secondary imaging system 9, distorted images will be formed also on the photoelectrical changing element 11.

FIG. 5 is an illustration showing distortion of an image on a sensor.

Figure 6:
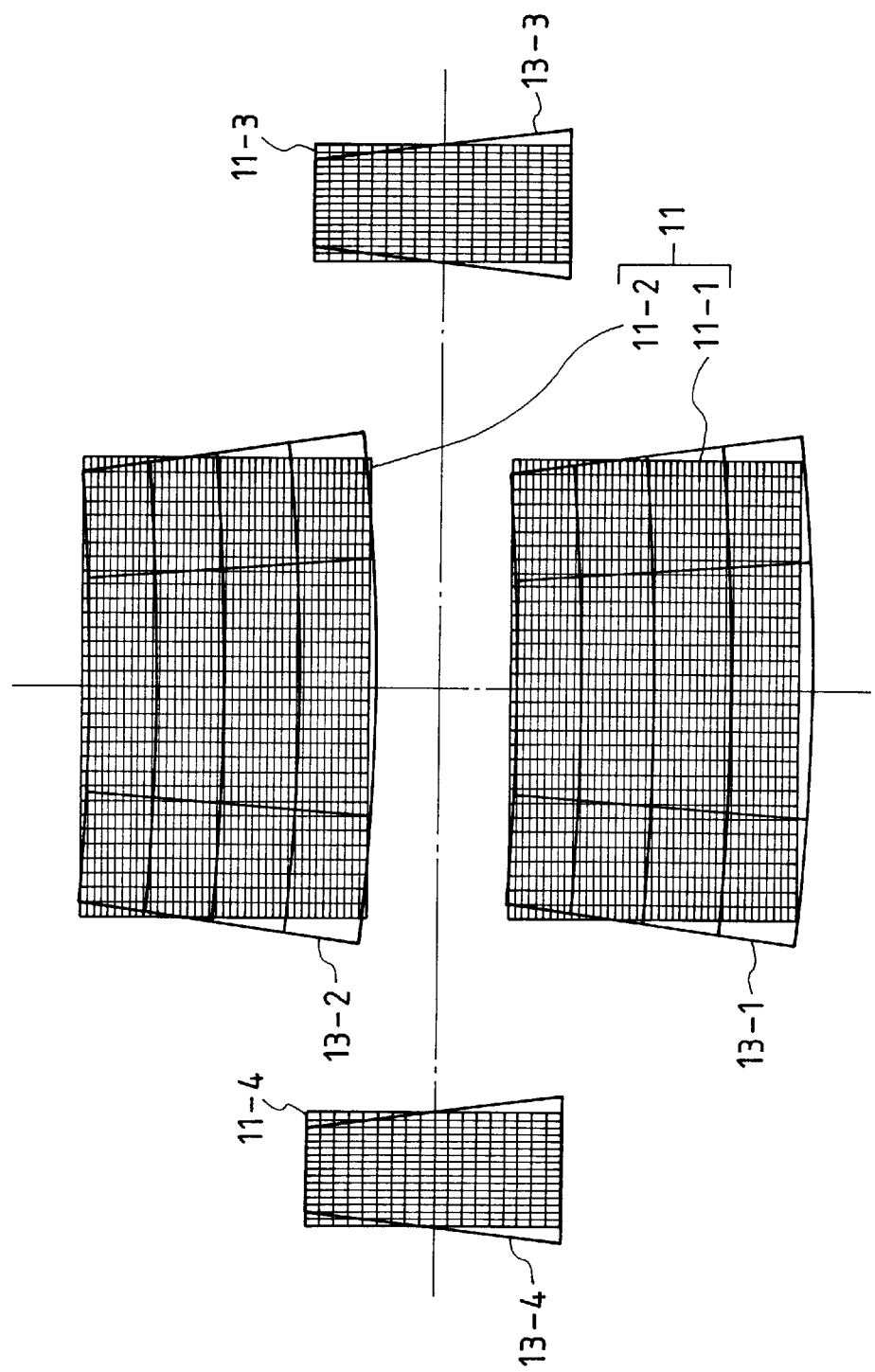
FIG. 6 is an illustration showing the distortion of an image on the photoelectric conversion element of FIG. 1.
Figure 7:
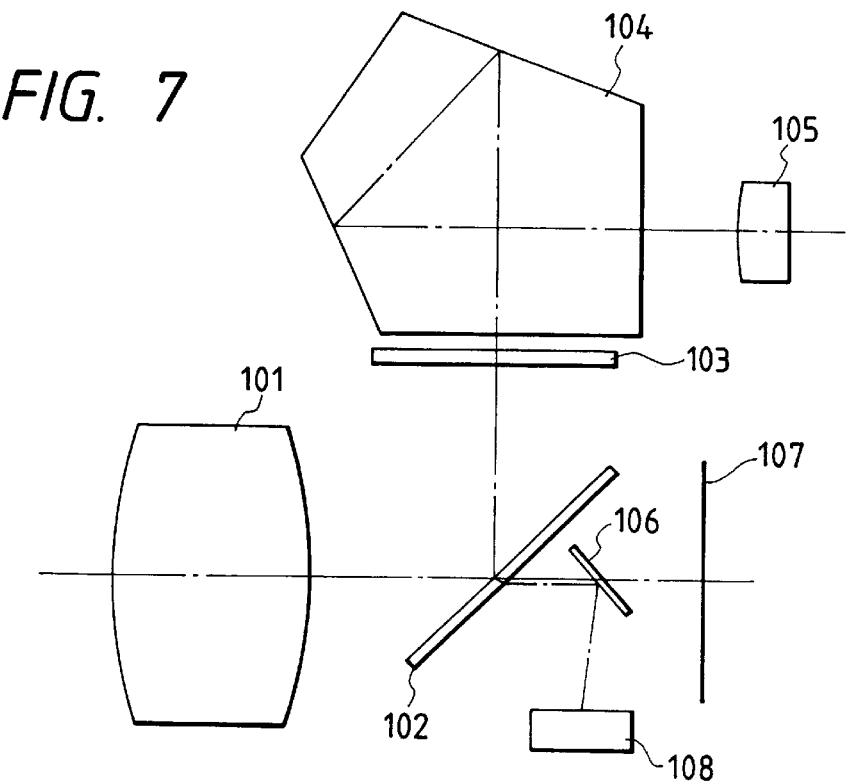
FIG. 7 is a schematic view showing a camera having a focus detecting apparatus according to the conventional art.
Figure 8:
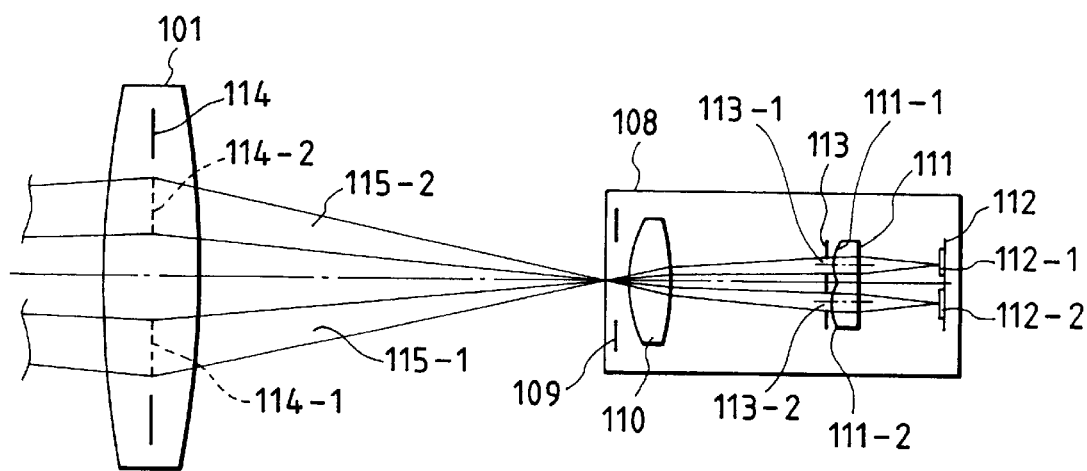
FIG. 8 is a schematic view showing the focus detecting apparatus according to the conventional art.

FIG. 6 is a plan view of the photoelectrical changing element 11 showing that state, and on the area sensors 11-1, 11-2, 11-3 and 11-4, rectangles are formed as distorted images as indicated by images 13-1, 13-2, 13-3 and 13-4.

It is popular that the area sensors are constructed with rectangular pixels regularly arranged in vertical and horizontal directions as shown as the area sensors 11-1, 11-2, 11-3 and 11-4 of FIG. 6, and their configurations are usually rectangular. In contrast, the fact that the distorted images 13-1, 13-2, 13-3 and 13-4 as shown in FIG. 6 are formed means that the images of the four rectangular area sensors 11-1, 11-2, 11-3 and 11-4 reversely projected onto the film 2 become conversely distorted and the field of view for effecting focus detection is inclined in the marginal portion thereof.

However, if the four object images formed on the four area sensors 11-1, 11-2, 11-3 and 11-4 are equally distorted relative to the area sensors 11-1, 11-2, 11-3 and 11-4, it will be no obstacle to the detection of the relative position of the four object images that the field of view is inclined. Regarding the deviation between two object images in the row direction (correlative direction) of the area sensors 11 for detecting the relative position, the output from the photoelectrical changing element can be calculated and corrected by a method similar to that disclosed, for example, in Japanese Laid-Open Patent Application No. 62-173412 and therefore, if there is no deviation between two object images in a direction perpendicular to the low direction (correlative direction) of the area sensors 11, focus detection can be effected well.

Again, in the present embodiment, the four individual object images formed on the four area sensors 11-1, 11-2, 11-3 and 11-4 exhibit great distortion, but the difference of the distortion in the direction which is perpendicular to the row direction (correlative direction) of the area sensors 11 is sufficiently small.

If the difference in the direction perpendicular to the row direction of the area sensors remains and affects focus detection accuracy, a light intercepting member, for example, a mask of aluminum or the like, curved correspondingly to the difference in distortion along each sensor array can be provided on the light receiving surface of each sensor, as disclosed in Japanese Laid-Open Patent Application No. 61-15112, to thereby improve accuracy.

It is also possible to adjust the imaging magnification of each image as a method of correcting the difference in the distortion of the four object images. Concretely, in FIG. 2, the vertex positions (the lens surface vertex positions) of the exit side surfaces of the two lenses 9-1 and 9-2 of the secondary imaging lens 9 along the optical axis can be set so as to differ from each other or the whole of the secondary imaging lens 9 can be set obliquely with respect to the optical axis and the imaging magnifications of the two lenses 9-1 and 9-2 can be varied. Also, by the photoelectrical changing element 11 being inclined instead of being provided perpendicularly to the optical axis, the adjustment of the magnifications and distortions of the two object images can be effected.

The above-described embodiment is such that as shown in FIG. 4, four distributions of light quantity regarding the object images are formed in the vertical direction and the horizontal direction on the photoelectrical changing element 11 and the deviations in the vertical direction and in the horizontal direction are detected. In the focus detecting apparatus of such a construction, focus detection is possible both for an object like a horizontal line having light and shade in a vertical direction, and for an object like a vertical line having light and shade in a horizontal direction.

As can be seen from FIGS. 4 and 5, in the present embodiment, the field areas corresponding to the area sensors 11-3 and 11-4 for detecting the phase difference between the object images in the horizontal direction are set small relative to the field areas corresponding to the area sensors 11-1 and 11-2 for detecting the phase difference between the object images in the vertical direction. This is for the following reason.

In the present embodiment, it is necessary to make the distortions of the rectangular images 13-1 and 13-2 of FIG. 6 or the difference therebetween and the distortions of the rectangular images 13-3 and 13-4 or the difference therebetween small at one time, but it is not always easy to make these compatible because the directions, in which the difference between the two images particularly poses a problem, are orthogonal to each other. The light beams forming the two sets of object images are reflected in an area common in the first reflecting mirror and the second reflecting mirror and therefore, it is also difficult to cope with the problem by contriving the shapes of these reflecting mirrors. In such a situation, it is very effective to set the direction in which the phase difference of one of the two sets of object images is detected short.

Also, by such a construction, the photoelectrical changing element 11 can avoid becoming extremely bulky and it becomes possible to dispose the focus detecting apparatus easily even in a limited space within a camera. Further, to effect focus detection in any two-dimensional area, an enormous calculating process is necessary as compared with the conventional art focus detecting apparatus, and it is advantageous in effecting quick focus detection to make the pixels of the sensors necessarily at a minimum.

A description will now be made of an embodiment in which the reflecting mirror 4 is especially contrived. In the next embodiment, the first reflecting mirror 4 is made into a surface, in which a rotation symmetry axis is absent. A general expression representing the surface shape of the first reflecting mirror 4 used in the present embodiment is shown in the following expression (1), and the specific expressions of Pi (y, z) in expression (1) are shown in Table 1 below.

$$X = \frac{h^2/R}{1 + \sqrt{1 - (h/R)^2}} + \Sigma C_i P_i(y,z) - \Delta \quad (1)$$

where $$h = \sqrt{y^2 + z^2} \quad (2)$$

The first term in expression (1) represents a spherical surface of a radius R, and the second term is what is called Zernike's polynominal. Also, the third term $\Delta$ is a correcting term for rendering the x coordinates at the center of the surface 0 (zero) and is represented by the following expression:

$$\Delta = -C_3 + C_8 - C_{15} + C_{25} - C_{35} \quad (3)$$

The value of each coefficient Ci in expression (1) in the present embodiment is shown in Table 2 below. Each coefficient in Table 2 is for the coordinate system 14 attached to the first reflecting mirror 4 of FIG. 9.

Figure 9:
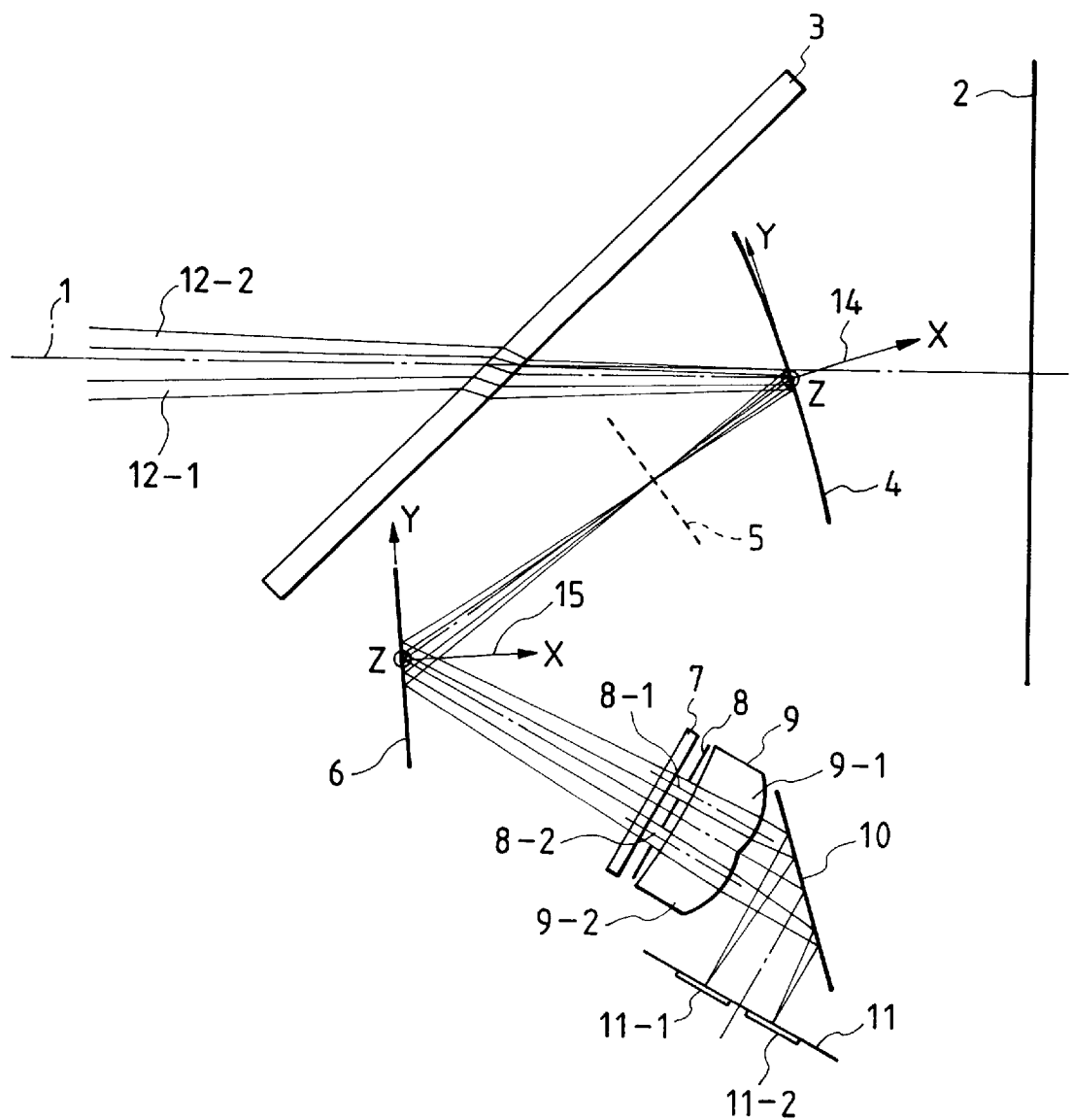
FIG. 9 is an illustration showing the construction of a portion of an embodiment of the present invention.
Figure 10:
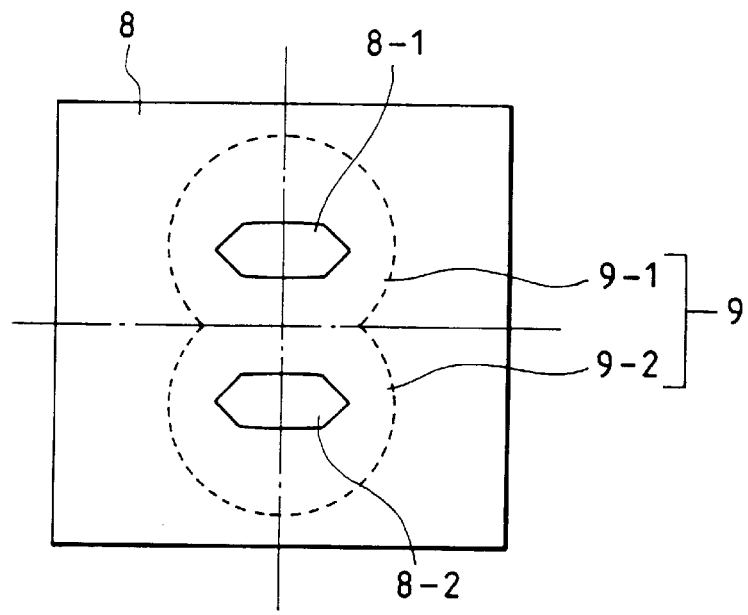
FIG. 10 is an illustration showing the aperture and secondary imaging system in the embodiment of the present invention.
Figure 14:
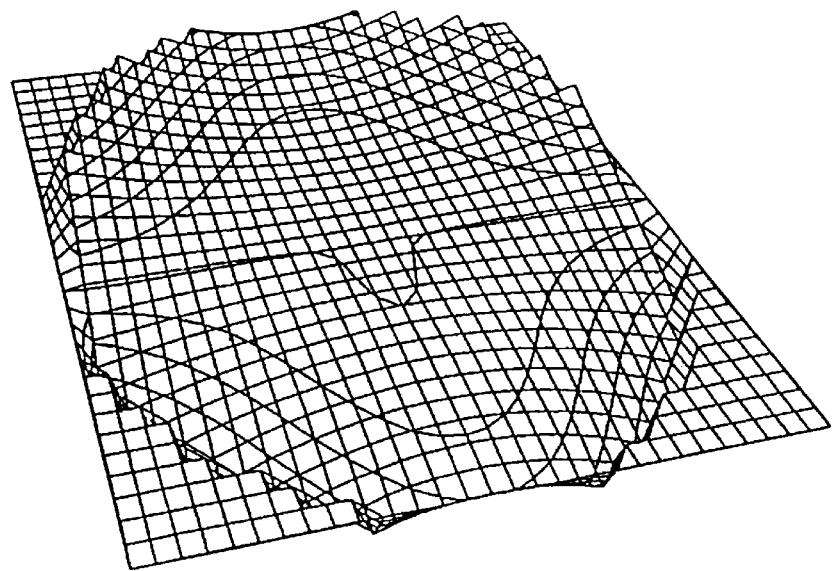
FIG. 14 is an illustration showing the shape of the reflecting surface of a first reflecting mirror in the embodiment of the present invention.

FIG. 14 is a bird's when the shape of the portion of the surface shape of the first reflecting mirror in the present embodiment except the spherical surface of the first term represented by expression (1) is seen from the positive direction of the x coordinate axis of the coordinate system 14 of FIG. 9.

As is apparent from FIG. 14, the surface shape of the first reflecting mirror 4 has symmetry with respect to an xy plane which is attributable to the symmetry of the focus detecting system shown in FIG. 9, but lacks such a rotational axis that will become rotation-symmetrical.

Figure 13:
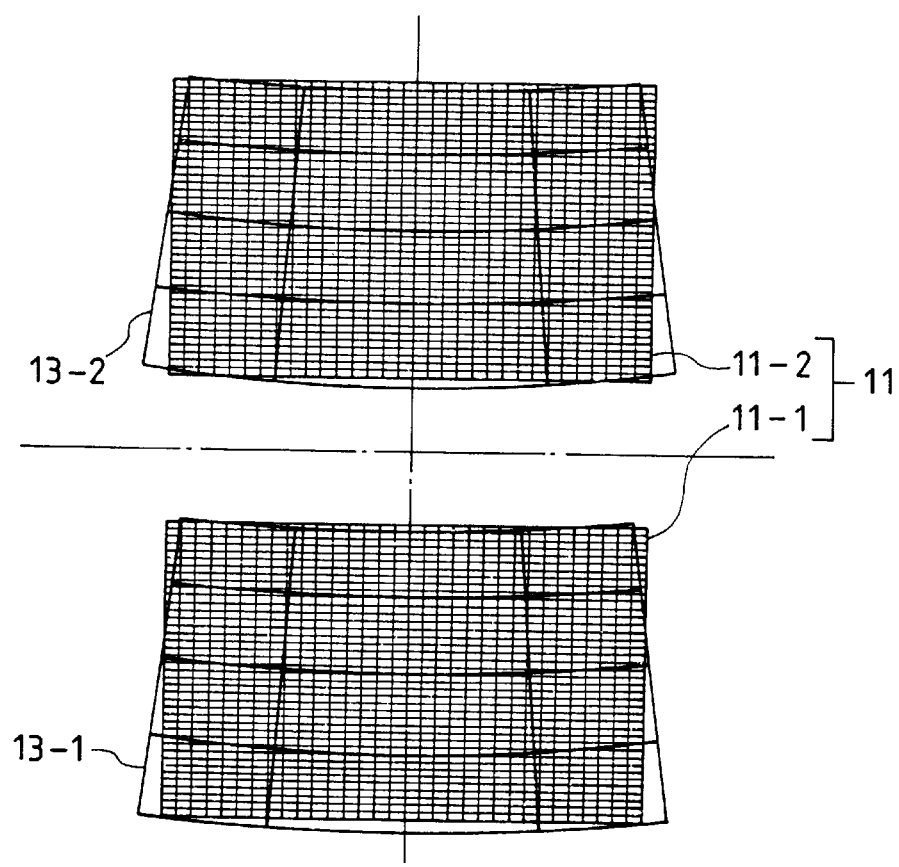
FIG. 13 is an illustration showing the distortion of an image on the photoelectric conversion element.
Figure 15:
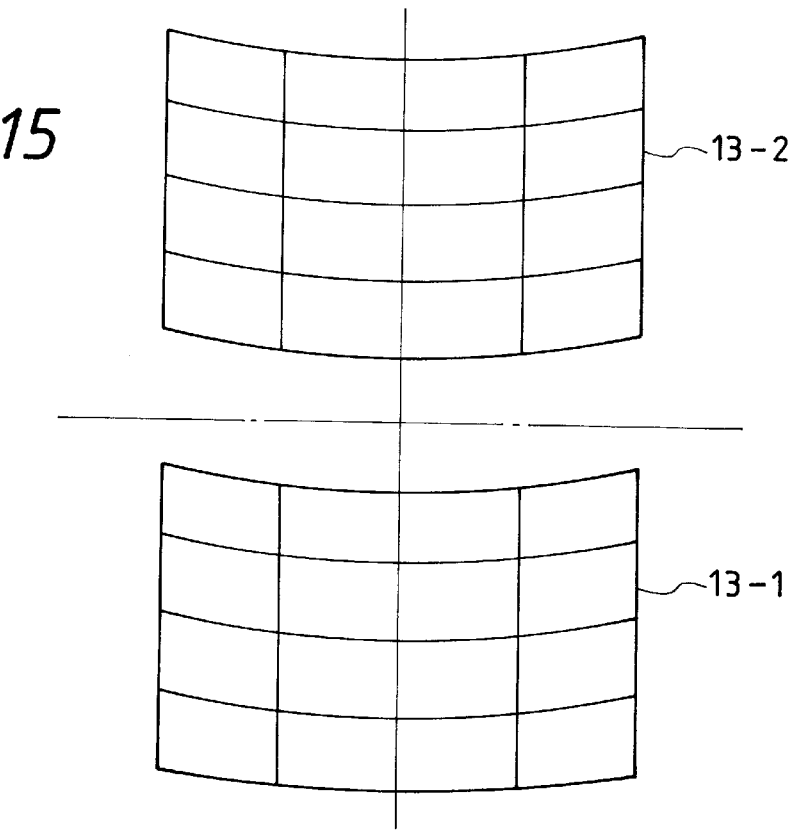
FIG. 15 is an illustration showing images on the photoelectric conversion element in the embodiment of the present invention.

FIG. 15 shows rectangular images 13-1 and 13-2 on the photoelectric conversion element 11 corresponding to FIG. 13 when the surface shape of the present embodiment is applied to the first reflecting mirror 4. It will be seen that the inclination with respect to the row direction (vertical direction) in which the phase difference between the area sensors on the photoelectrical changing element 11 is detected is corrected. Distortion remains in a direction orthogonal to this direction, but it will hardly pose a problem in effecting focus detection because the widthwise direction (horizontal direction) of the sensor arrays affected by the distortion is sufficiently narrow.

When a spherical mirror is employed as the reflecting mirror 4, the magnification of an image formed by a light beam reflected by the upper portion (the positive direction of the y-axis) of the reflecting mirror 4 becomes small and conversely, the magnification of an image formed by a light beam reflected by the lower portion (the negative direction of the y-axis) of the reflecting mirror 4 becomes great.

In order to correct this, the reflecting mirror 4 in the present embodiment in its upper portion assumes a convex shape relative to the central portion, i.e., such a surface shape that has divergent power, to deflect the rays of light more outside, and in its lower portion assumes a concave shape relative to the central portion, i.e., such a surface shape that has convergent power, to deflect the rays of light more inside.

The great distortion as shown in FIG. 13 is corrected by using the reflecting mirror of the present embodiment, but there is the possibility of sufficiently small distortion relative to the width of the sensor array remaining. It is possible to correct such minute distortion that cannot be neglected when highly accurate focus detection is effected by forming a light intercepting member, for example, a mask of aluminum or the like, curved in conformity with the distortion remaining on the sensor array, on the light receiving surface of each sensor, as disclosed in Japanese Laid-Open Patent Application No. 61-15112. During the correction, the distortion of each of the images formed on the two area sensors may be directly corrected, or the difference between the distortions of the images formed on the two area sensors may be corrected.

Also, the distortion in the row direction of the sensors which is the direction in which the phase difference between two images is detected can be corrected by calculation-processing the output from the photoelectric conversion element by the technique disclosed in Japanese Laid-Open Patent Application No. 62-173412.

What is important when the distortion of images is corrected by the use of the reflecting mirror of the present embodiment is to correct the distortion itself of each image on the photoelectrical changing element 11 and at the same time, to make the magnifications of the two images on the photoelectrical changing element 11 equal to each other. When this compatibility is difficult, it is also possible to effect the correction of the distortion of the images chiefly by the reflecting mirror of the present embodiment and effect the adjustment of the magnifications by the lenses 9-1 and 9-2 of the secondary imaging system 9. Specifically, in FIG. 9, the vertex positions of the exit side surfaces of the two lenses 9-1 and 9-2 of the secondary imaging system 9 along the optical axis can be set so as to differ from each other, on the whole of the secondary imaging system 9 can be set obliquely with respect to the optical axis and the imaging magnifications of the two lenses 9-1 and 9-2 can be varied. The adjustment of the magnifications and distortion of the two images can also be effected by not providing the photoelectrical changing element 11 perpendicularly to the optical axis, but inclining it.

The present embodiment is one in which a reflecting surface free of axis symmetry is applied to the first reflecting mirror 4 in FIG. 9, but the object of the present invention can also be achieved by using a surface having a similar characteristic in the second reflecting mirror 6.

Figure 16:
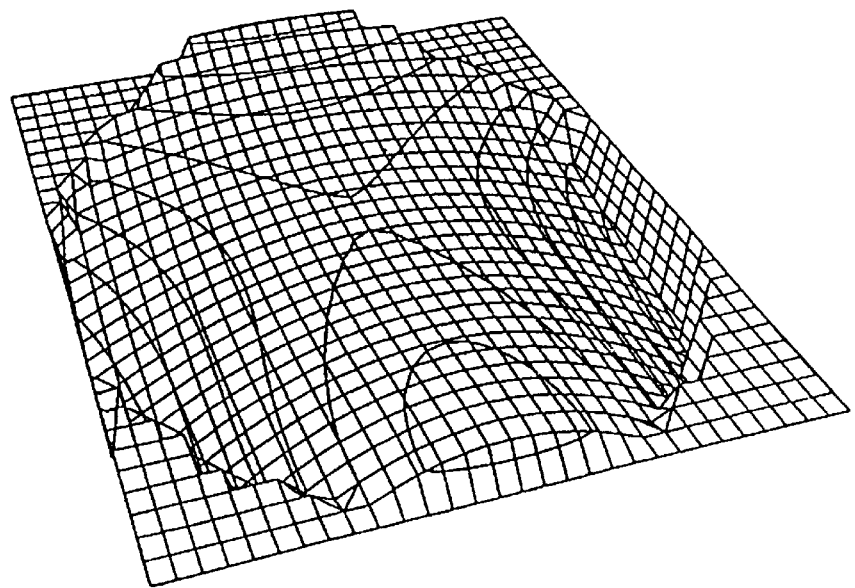
FIG. 16 is an illustration showing the shape of the reflecting surface of a second reflecting mirror in Embodiment 2 of the present invention.

Table 3 shows the specific numerical values of another embodiment of the present invention in which the first reflecting mirror 4 in FIG. 9 is made spherical and a surface free of axis symmetry is used in the second reflecting mirror 6 by the coefficients of Zernike's polynomial as in the previous embodiment, and FIG. 16 shows a bird's-eye view when the shape of Embodiment 3 represented by the same table is seen from the positional direction of the x coordinate axis of the coordinate system 15 of FIG. 9. However, FIG. 16, unlike FIG. 14, includes the spherical term of expression (1).

Figure 17:
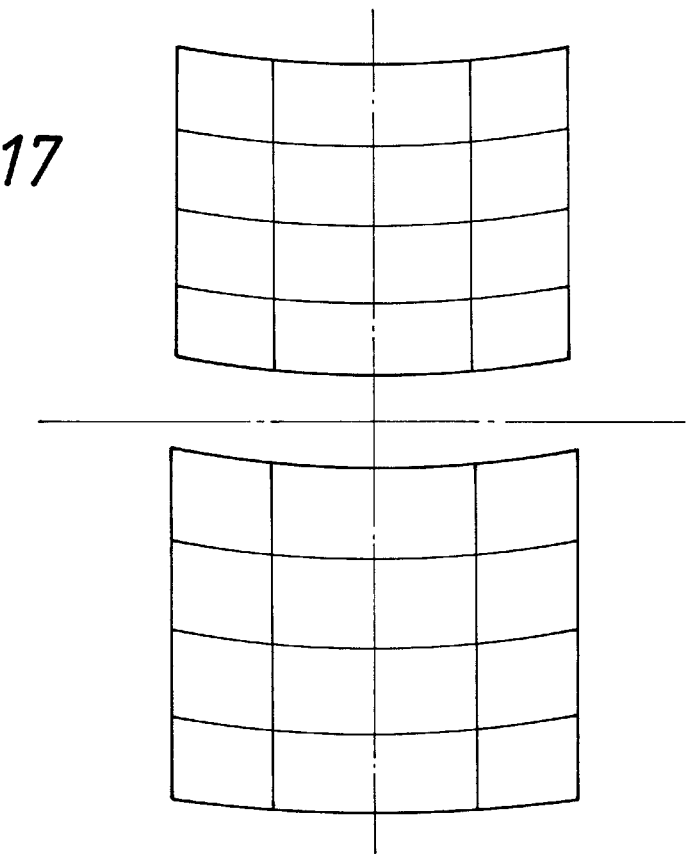
FIG. 17 is an illustration showing an image on a photoelectric conversion element in Embodiment 2 of the present invention.

FIG. 17 shows the imaged state on the photoelectrical changing element 11 when the shape represented by Table 3 is used as the surface of the second reflecting mirror 6, and as in FIG. 15, the correction of the distortion of the images is effected.

According to FIG. 16, the reflecting mirror 6 of Embodiment 3, in its upper portion (the positive portion of the y-axis), assumes a concave shape relative to the central portion, i.e., such a surface shape that the convergent power, so as to deflect the rays of light more inside, and in its lower portion, assumes a convex shape relative to the central portion, i.e., such a surface shape that has a divergent power, so as to deflect the rays of light more outside, in order to eliminate or alleviate the distortion of the images.

As compared with the surface shape of the reflecting mirror of Embodiment 2, the reflecting mirror of the present embodiment has a characteristic converse in the vertical direction, and this is because the light beam incident on the marginal portion of the first reflecting mirror 4 is inclined in a direction diverging relative to the optical axis 1, whereas the light beam incident on the marginal portion of the second reflecting mirror 6 is conversely inclined in a direction converging from each point on the imaging plane 5 toward the openings 8-1 and 8-2 in the aperture 8.

Generally, for a focus detecting system of the phase difference type to operate with good accuracy, it is necessary to prevent a light beam to be taken in by the focus detecting system from being intercepted by the pupil of an objective lens. When the focus detecting apparatus of the present invention is used only for bright limited objective lenses, it will pose no great problem, but yet when as in a single-lens reflex camera, it is applied to interchangeable lenses having various pupil positions and various degrees of brightness, it is necessary to adopt a construction taking the pupil projection relation between the objective lens and the focus detecting system into account.

As previously described, the pupil projection of the two in the present invention is effected chiefly by the power of the first reflecting mirror 4, but it is also greatly affected by the surface shape of the second reflecting mirror 6. Accordingly, when the pupil condition of the objective lens is severe, it is necessary to optimize the projection of the pupil at the same time when the correction of the distortion of the images shown in Embodiments 2 and 3 is effected. Embodiment 4 of the present invention which has realized this will herein after be described with reference to FIGS. 18, 19, 20, 21A and 21B.

Embodiment 4 is one in which a reflecting surface having no rotation symmetry axis is used in each of the first reflecting mirror 4 and the second reflecting mirror 6 and the distortion of the images on the photoelectrical changing element 11 is corrected and also the projection relation between the exit pupil 101a of the objective lens 101 and the entrance pupil (aperture 8) of the focus detecting apparatus is well optimized.

Figure 18:
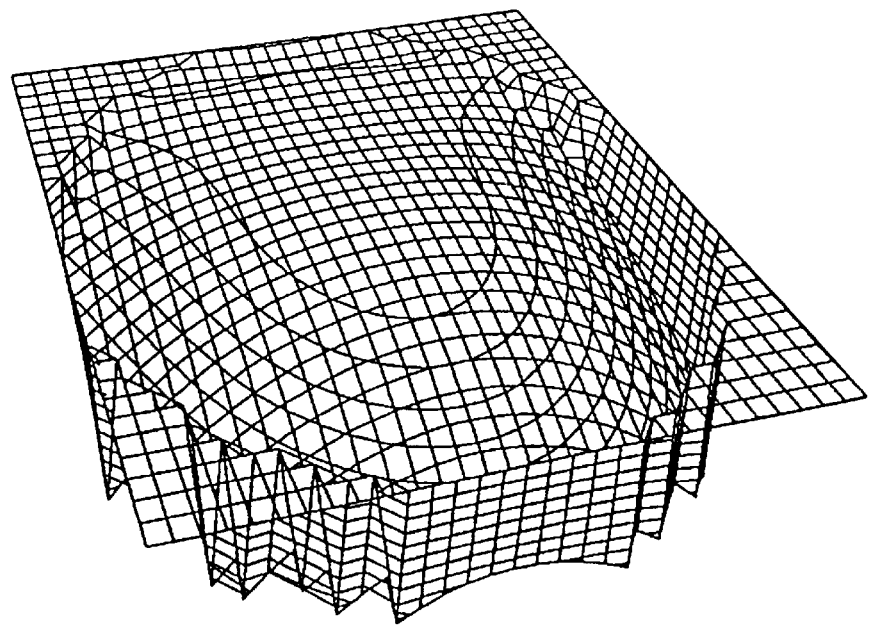
FIG. 18 is an illustration showing the shape of the reflecting surface of a first reflecting mirror in Embodiment 3 of the present invention.
Figure 19:
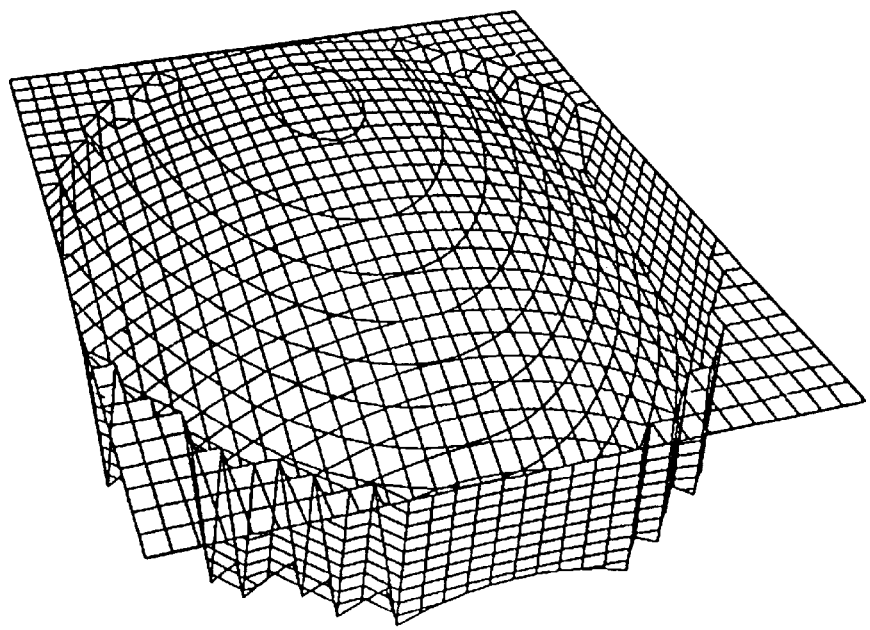
FIG. 19 is an illustration showing the shape of the reflecting surface of a second reflecting mirror in Embodiment 3 of the present invention.

FIGS. 18 and 19 are bird's-eye views showing the surface shapes of the first reflecting mirror 4 and the second reflecting mirror 6, and in these figures, the coordinate axes and the directions in which the surfaces are seen are the same as those in FIGS. 14 and 16. Also, Tables 4 and 5 show Zernike's coefficients representing the surface shapes of the respective reflecting mirrors.

Figure 20:
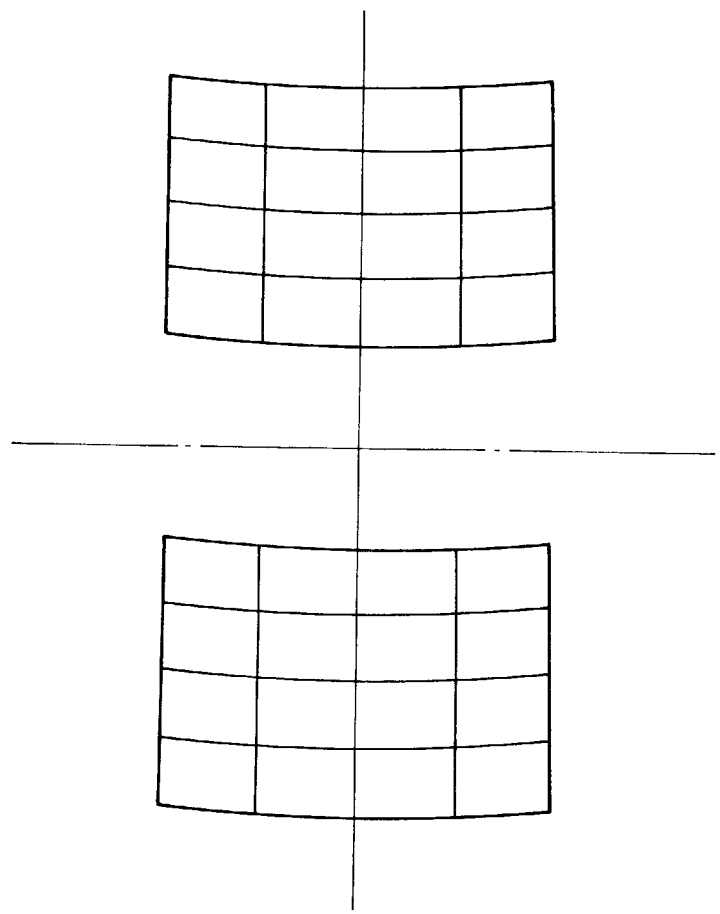
FIG. 20 is an illustration showing an image on a photoelectric conversion element in Embodiment 3 of the present invention.

FIG. 20 shows the shapes of rectangular images on the photoelectrical changing element 11 when these reflecting mirrors are used, and as in Embodiments 2 and 3, the distortion of the images is corrected.

The surface shape of the first reflecting mirror 4 of Embodiment 4 shown in FIG. 18, like the first reflecting mirror of Embodiment 2, is such that in the upper portion (the positive direction of the y-axis) of the reflecting mirror, it has a convex shape relative to the central portion, i.e., divergent power, in order to deflect the rays of light more outside, and conversely in the lower portion (the negative direction of the y-axis) on which the light beam is incident and which corresponds to an area in which the magnification becomes greater, it has a concave shape relative to the central portion, i.e., convergent power, in order to deflect the rays of light more inside, and the surface shape of the second reflecting mirror 6 of Embodiment 4 shown in FIG. 19, like the second reflecting mirror 6 in Embodiment 3, is designed to have more convergent power in the upper portion (the positive direction of the y-axis) of the reflecting mirror, and more divergent power in the lower portion (the negative direction of the y-axis) of the reflecting mirror.

That is, in each reflecting mirror in Embodiment 4, the optimization of the projection of the pupil is effected at the same time and therefore, the power distributions of the respective reflecting mirrors somewhat differ from each other, but the reflecting mirrors in the present embodiment have characteristics similar to those in the previous embodiments and achieve the object of the present invention.

Figure 21A:
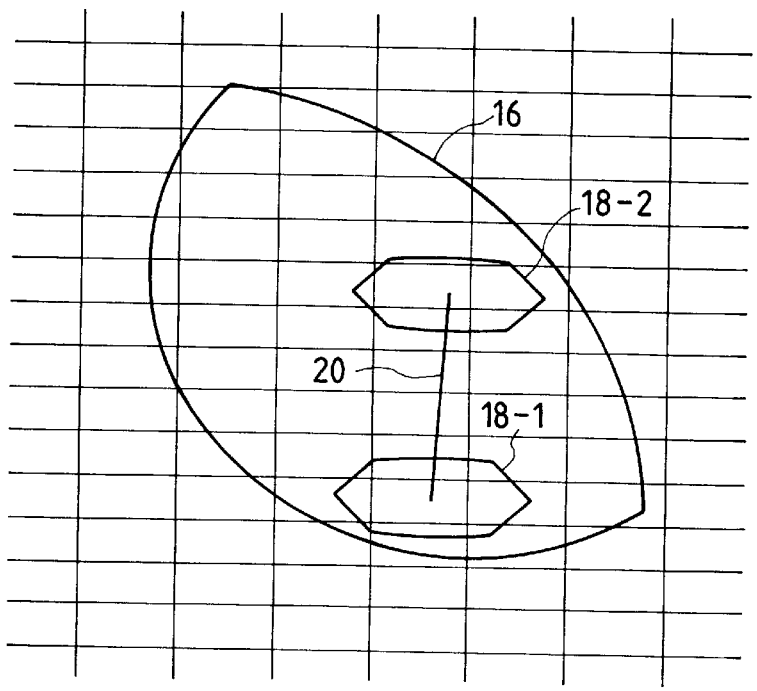
FIGS. 21A and 21B are illustrations showing the exit pupil of an objective lens and the entrance pupil of a focus detecting apparatus according to Embodiment 3 of the present invention.
Figure 21B:
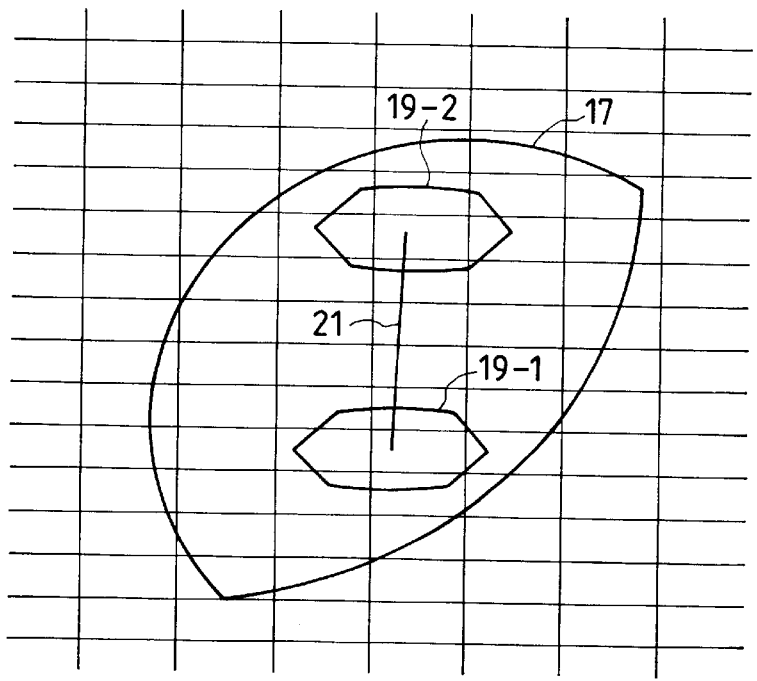

FIGS. 21A and 21B show the shapes 16 and 17 of the exit pupil of the objective lens as it is seen from the two upper and lower apexes of that rectangle in the rectangular focus detection range defined on the film 2 which is severest in the condition of pupil projection, and the images 18-1, 18-2 and 19-1, 19-2 of the openings 8-1 and 8-2 in the aperture 8 of the focus detecting apparatus projected onto the same surface via the first reflecting mirror 4 and second reflecting mirror 6 of Embodiment 4. As shown in these figures, the projected images 18-1, 18-2 and 19-1, 19-2 of the openings 8-1 and 8-2 in the aperture 8 are present in the exit pupils 16 and 17 of the objective lens wherein aperture eclipse has occurred, and the light beam to be directed to the focus detecting system is not intercepted by the pupil of the objective lens.

Also, what is important as the projected state of the pupil is to make the inclination of segments 20 and 21 passing through the centers of the two projected images in FIGS. 21A and 21B as small as possible. If the amount of this inclination is great, it will become difficult to detect the amount of deviation of the focus of the objective lens with good accuracy because the deviation between the distributions of light quantity regarding the two object images on the photoelectrical changing element 11 resulting from the deviation of the focus occurs in an oblique direction greatly inclined with respect to the sensor row direction. The surface shapes of the first and second reflecting mirrors of Embodiment 4 are ones taking this point also into account.

Figure 11:
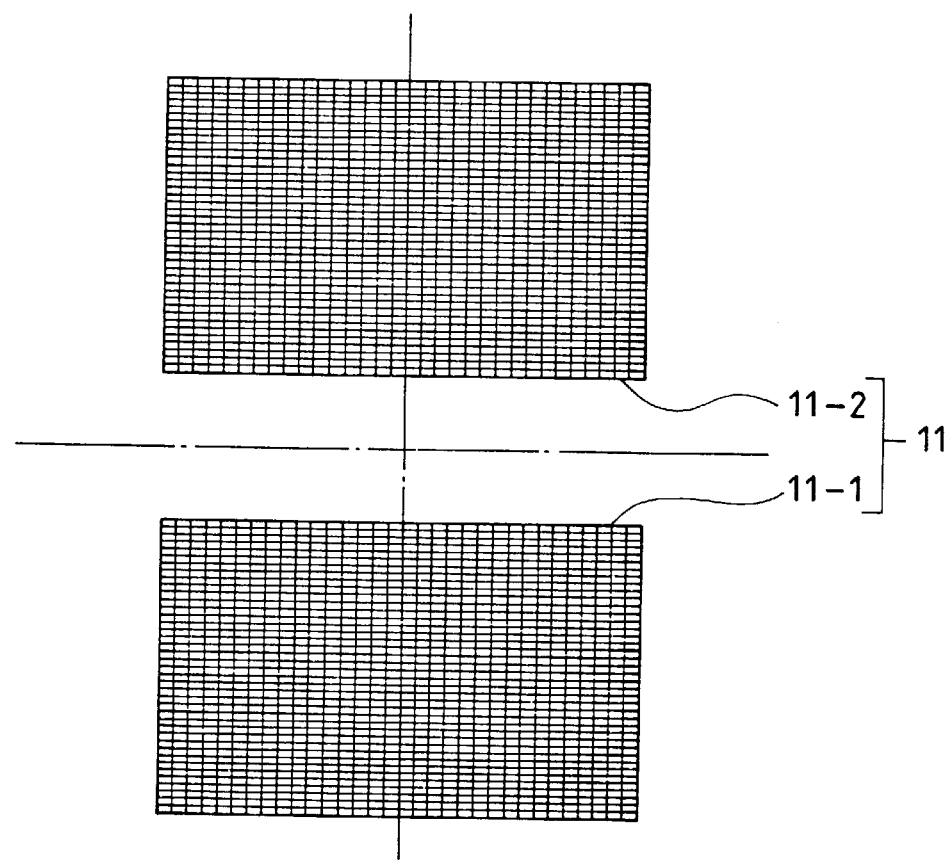
FIG. 11 is an illustration showing a photoelectric conversion element in the embodiment of the present invention.

The above-described embodiments are ones which form two distributions of light quantity vertically on the photoelectrical changing element 11 as shown in FIG. 11 and detect the vertical deviation therebetween. In the focus detecting apparatus of such a construction, focus detection is possible only for an object such as a lateral line having light and shade in a vertical direction, and focus detection is impossible for an object such as a vertical line having light and shade in a horizontal direction.

Now, such as in FIG. 2, it goes without saying that a distance to an object in a vertical direction can be measured by constructing the secondary imaging system. However, an optional explanation is stated hereinafter.

Figure 22:
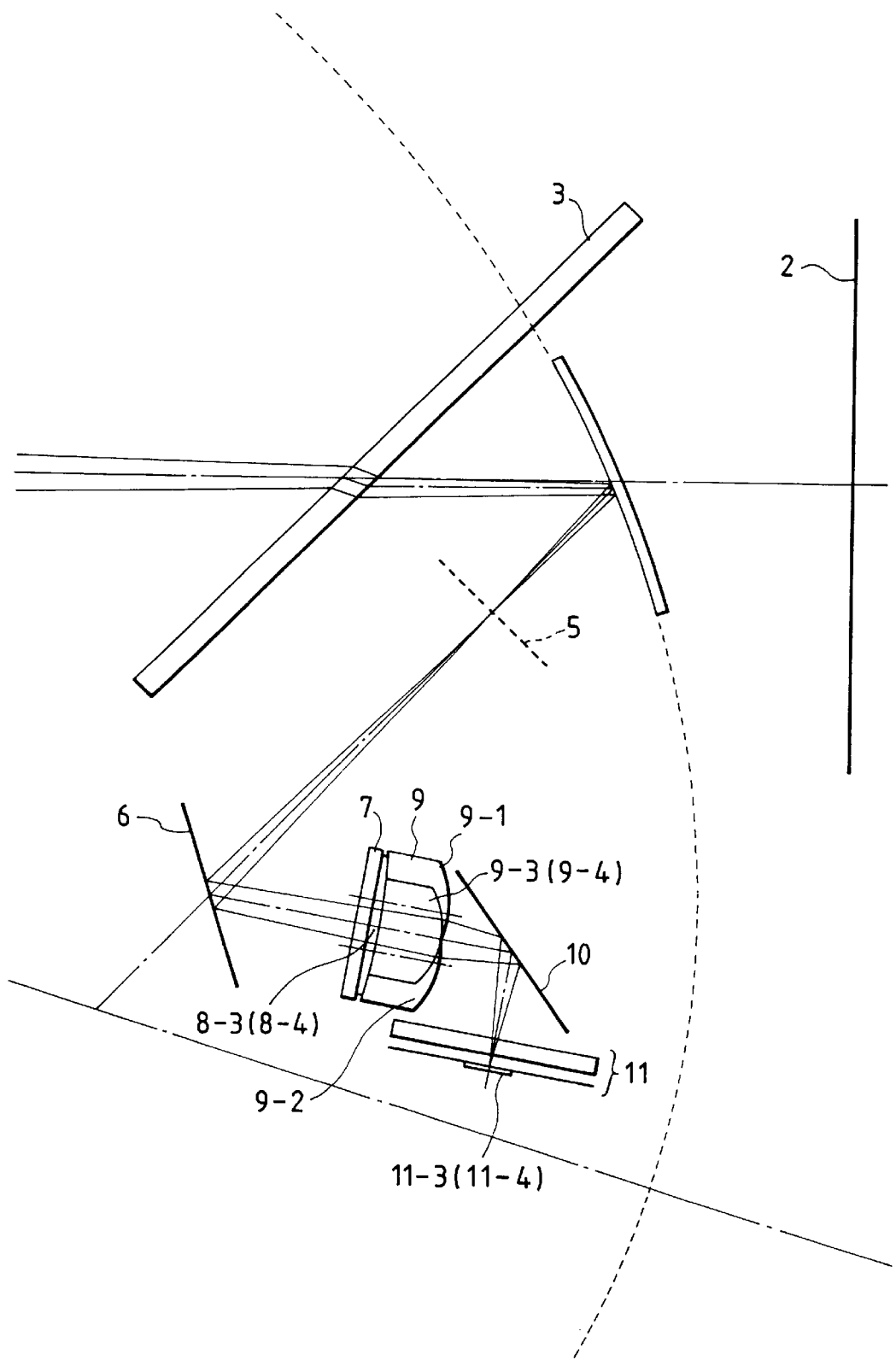
FIG. 22 is an illustration showing the construction of Embodiment 4 of the present invention.

Embodiment 5 is an improvement in this point, and the construction thereof is shown in FIG. 22. The difference of this embodiment from the embodiment of FIG. 9 is that two lenses 9-3 and 9-4 are disposed in the secondary imaging system 9 comprising two lenses 9-1 and 9-2 in a direction orthogonal thereto and provision is made of openings 8-3 and 8-4 in the aperture 8 corresponding thereto and area sensors 11-3 and 11-4 on the photoelectric conversion element 11.

In FIG. 22, to avoid cumbersomeness, the openings 8-1 and 8-2 in the aperture 8, the area sensors 11-1 and 11-2 on the photoelectric conversion element 11 and the light beams 12-1 and 12-2 shown in FIG. 2 are not shown.

Figure 23:
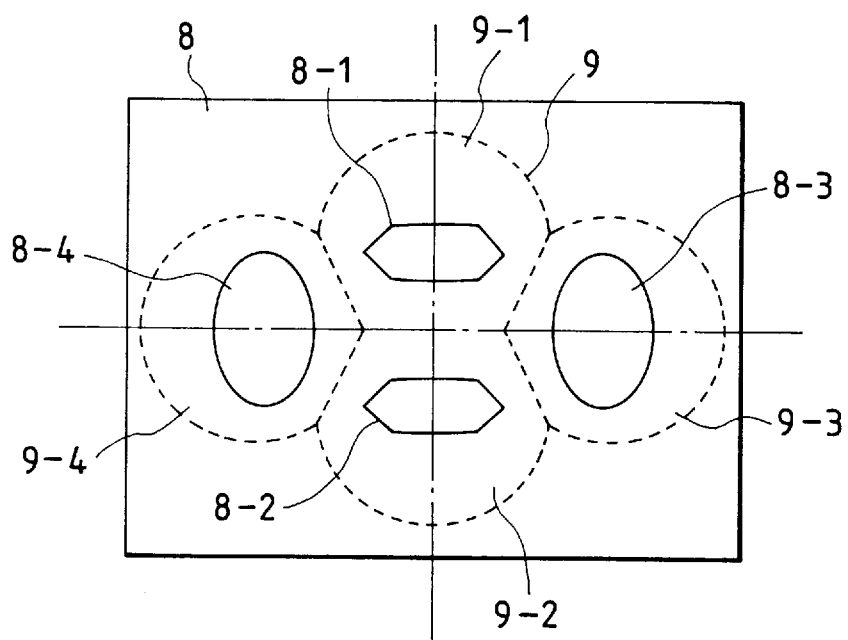
FIG. 23 is an illustration showing an aperture and secondary imaging system in Embodiment 4 of the present invention.

FIG. 23 shows the shapes of the openings in the aperture 8 in Embodiment 5. In FIG. 23, the reference numerals 8-3 and 8-4 designate the newly added openings, and the reference numerals 9-3 and 9-4 denote two lenses constituting the second imaging system 9 which are disposed correspondingly to and rearwardly of the newly added openings.

In the present embodiment, the openings 8-3 and 8-4 in the aperture 8 of FIG. 23 are disposed more outside as compared with the openings 8-1 and 8-2, so as to introduce the light in the area around the pupil of the objective lens.

By adopting such a construction, the so-called base line length during focus detection can be made greater and the focus detecting system by the newly added openings 8-3 and 8-4 in the aperture 8 in Embodiment 5 can enhance focus detection accuracy for bright objective lenses. Of course, it is also possible to make such a design that the positions from the center at which the openings 8-3 and 8-4 are disposed are the same as those of the openings 8-1 and 8-2 and focus detection is always possible for an object equal in focus detection accuracy but having a distribution of light and shade only in one of the vertical and horizontal directions, irrespective of the brightness of the objective lens.

Figure 24:
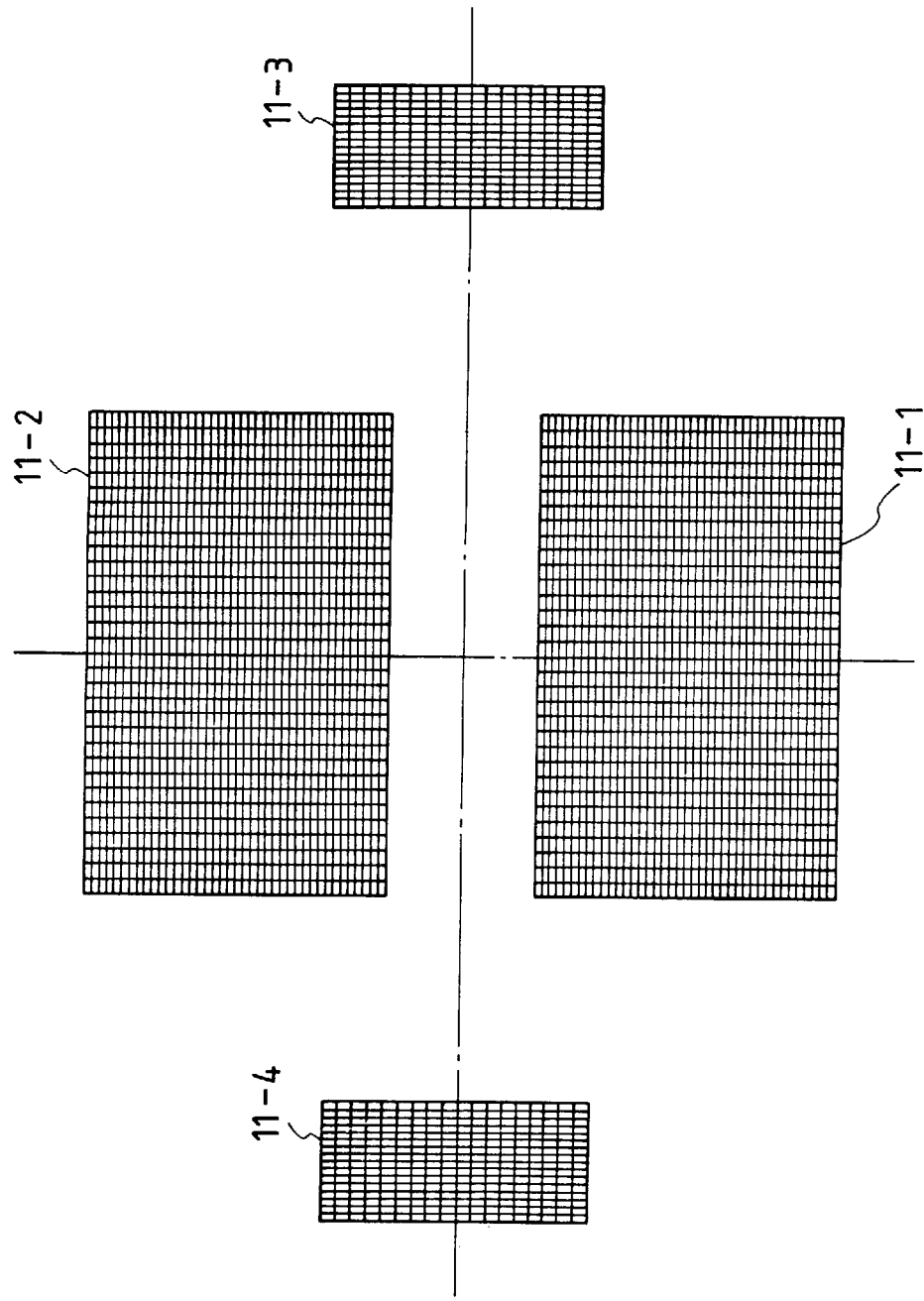
FIG. 24 is an illustration showing a photoelectric conversion element in Embodiment 4 of the present invention.

FIG. 24 shows area sensors 11-3 and 11-4 on the photoelectrical changing element 11 on which distributions of light quantity are formed by secondary imaging lenses 9-3 and 9-4.

Figure 25:
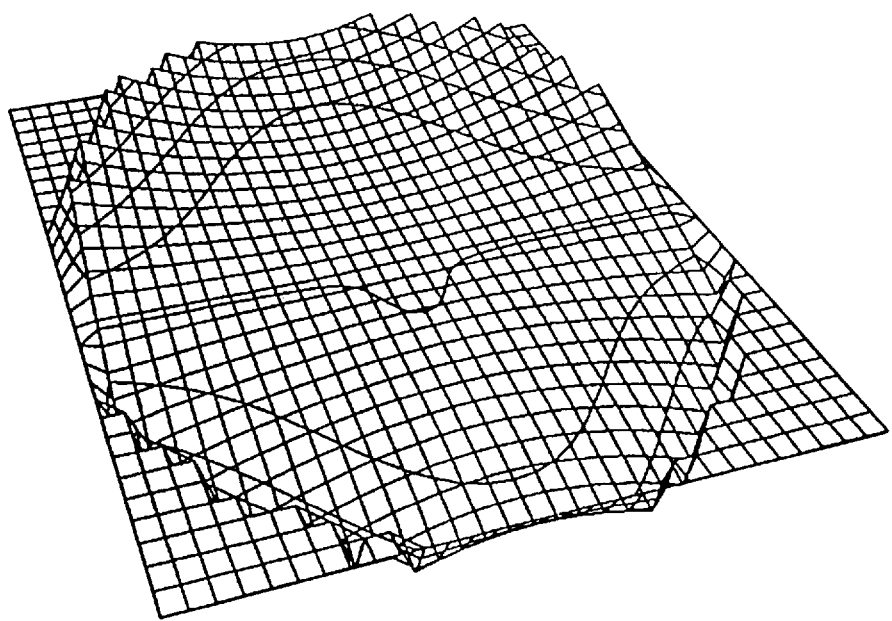
FIG. 25 is an illustration showing the shape of the reflecting surface of a first reflecting mirror in Embodiment 4 of the present invention.
Figure 26:
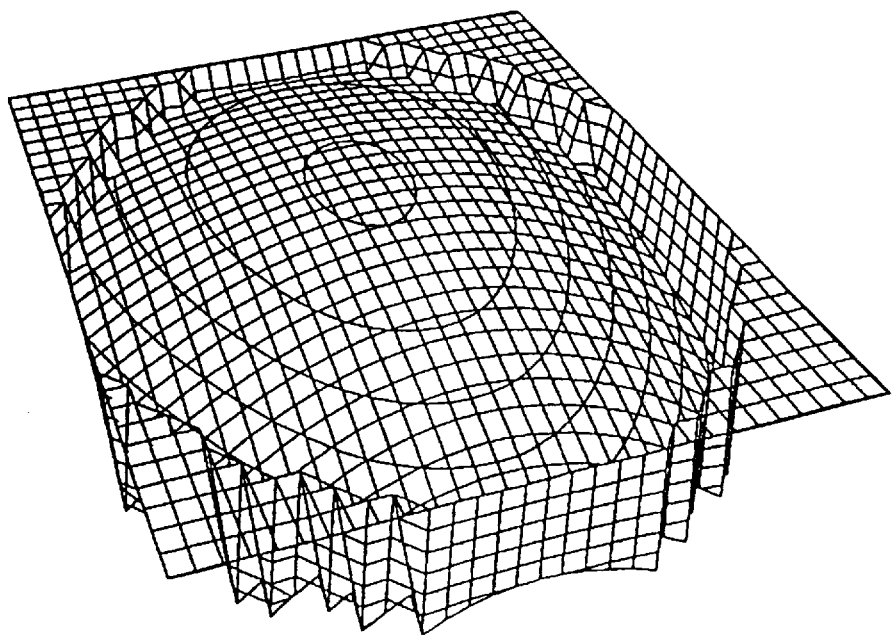
FIG. 26 is an illustration showing the shape of the reflecting surface of a second reflecting mirror in Embodiment 4 of the present invention.

Table 6 and FIG. 25 show Zernike's coefficients representing the surface shape of the first reflecting mirror used in Embodiment 5 and a bird's-eye view, respectively, and Table 7 and FIG. 26 show Zernike's coefficients representing the surface shape of the second reflecting mirror used in Embodiment 5 and a bird's-eye view, respectively. From FIGS. 25 and 26, it is seen that both of the reflecting mirrors have surface shapes having characteristics similar to those of the hitherto described embodiments.

Figure 27:
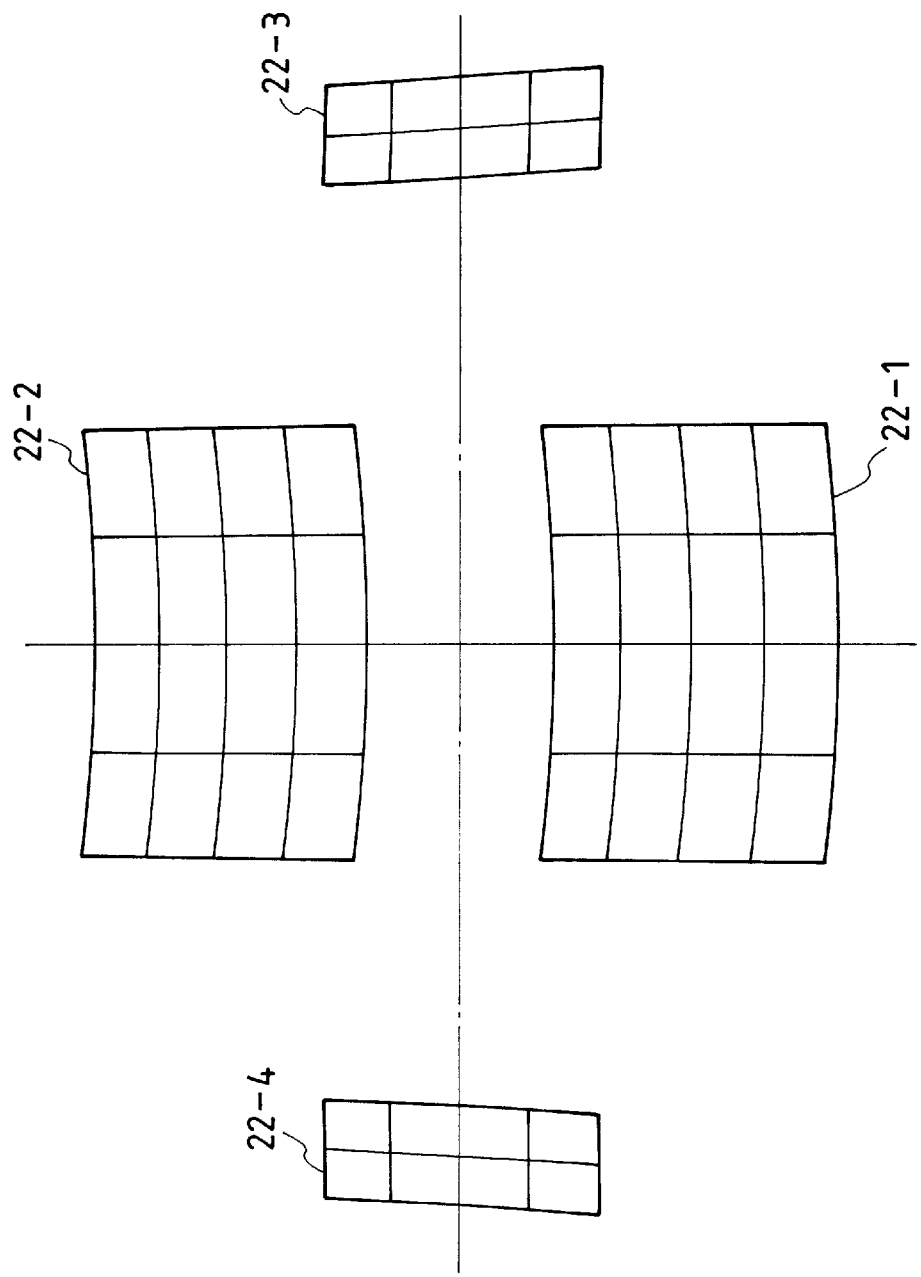
FIG. 27 is an illustration showing an image on the photoelectric conversion element in Embodiment 4 of the present invention.

FIG. 27 shows an imaged state on the photoelectrical changing element 11 similar to that shown in FIGS. 15 and 17 when these reflecting mirrors are used, and rectangular images 22-1 and 22-2 formed in the vertical direction and rectangular images 22-3 and 22-4 formed in the horizontal direction have their distortion substantially corrected in a direction in which the phase difference is detected.

As can be seen from FIGS. 24 and 27, in Embodiment 5, the field areas corresponding to the area sensors 11-3 and 11-4 for detecting the phase difference between the images in the horizontal direction are set small relative to the field areas corresponding to the area sensors 11-1 and 11-2 for detecting the phase difference between the images in the vertical direction. This is for the following reason.

In the present embodiment, it is necessary that the distortion correction for the rectangular images 22-1 and 22-2 in FIG. 27 and the distortion correction for the rectangular images 22-3 and 22-4 be effected at one time, but since the directions in which these should be corrected are orthogonal to each other, it is not always easy to realize sufficient correction. It also makes simultaneous correction difficult that the light beams forming those images are reflected in a common area in the first reflecting mirror and the second reflecting mirror. In order to solve such a problem, it is very effective to set the direction in which the phase difference of one of the two sets of object images is detected short.

Also, by such a construction, the photoelectrical changing element 11 can avoid becoming extremely large and it becomes possible for the focus detecting apparatus to be easily disposed even in a limited space in a camera. Further, to effect focus detection in any two-dimensional area, an enormous calculating process is necessary as compared with the conventional art focus detecting apparatus, and it is advantageous in effecting quick focus detection to make the pixels of the sensors necessarily at a minimum.

While, in the above-described embodiments, a reflecting surface shape free of axis symmetry is used in the first or second reflecting mirror, a similar reflecting surface shape may be applied to the third reflecting mirror 10 of FIG. 9. The third reflecting mirror is for disposing the focus detecting apparatus in a limited space in the bottom portion of a camera, but generally a reflecting surface free of axis symmetry is used for a reflecting surface provided between the first reflecting mirror and the photoelectrical changing element as required, whereby the object of the present invention is achieved.

As previously described, in FIG. 9, which shows the basic construction of the present invention, the second reflecting mirror 6 is designed to be retracted out of the photographing optical path during photographing with the main mirror 3 and the first reflecting mirror 4, but if it can be disposed in a camera, the second reflecting mirror may be provided at a lower position avoiding the photographing optical path and may be a fixed reflecting mirror which is not moved even during photographing. By doing so, mechanical structure can be simplified and also, the occurrence of an error resulting from the movement of the second reflecting mirror can be eliminated and thus, more highly accurate focus detection becomes possible.

While description has hitherto been made of the focus detecting apparatus of the phase difference detection type, the present invention is not restricted thereto, but is also effective for a focus detecting apparatus of other type effecting secondary imaging, for example, an apparatus for detecting the focus state from the sharpness of an object image. On the other hand, the present invention is suitably used when an area in which focus detection is possible is to be enlarged to a two-dimensional continuous area, but even if the present invention is applied to a conventional art focus detecting apparatus using a one-dimensional line sensor, the focus detecting position can be set more marginally.

Also, while in the foregoing, reflecting mirrors expressed by Zernike's polynomial have been shown as the embodiments of the reflecting mirror of the present invention, the object of the present invention will be achieved even if use is made of reflecting mirrors of other table type than this or a two-dimensional spline curved surface.

TABLE 1

$P_1(y, z) = z$
$P_2(y, z) = y$
$P_3(y, z) = 2h^2 - 1$
$P_4(y, z) = z^2 - y^2$
$P_5(y, z) = 2yz$
$P_6(y, z) = (3h^2 - 2)z$
$P_7(y, z) = (3h^2 - 2)y$
$P_8(y, z) = 6h^4 - 6h^2 + 1$
$P_9(y, z) = z(z^2 - 3y^2)$
$P_{10}(y, z) = y(3z^2 - y^2)$
$P_{11}(y, z) = (4h^2 - 3)(z - y)(z + y)$
$P_{12}(y, z) = 2(4h^2 - 3)yz$
$P_{13}(y, z) = (10h^4 - 12h^2 + 3)z$
$P_{14}(y, z) = (10h^4 - 12h^2 + 3)y$
$P_{15}(y, z) = 20h^6 - 30h^4 + 12h^2 - 1$
$P_{16}(y, z) = y^4 - 6y^2z^2 + z^4$
$P_{17}(y, z) = 4yz(z^2 - y^2)$

TABLE 1-continued $P_{18}(y, z) = (5h^2 - 4)z(z^2 - 3y^2)$
$P_{19}(y, z) = (5h^2 - 4)y(3z^2 - y^2)$
$P_{20}(y, z) = (15h^4 - 20h^2 + 6)(z - y)(z + y)$
$P_{21}(y, z) = 2(15h^4 - 20h^2 + 6)yz$
$P_{22}(y, z) = (35h^6 - 60h^4 + 30h^2 - 4)z$
$P_{23}(y, z) = (35h^6 - 60h^4 + 30h^2 - 4)y$
$P_{24}(y, z) = 70h^8 - 140h^6 + 90h^4 - 20h^2 + 1$
$P_{25}(y, z) = z(z^4 - 10y^2z^2 + 5y^4)$
$P_{26}(y, z) = y(5z^4 - 10y^2z^2 + y^4)$
$P_{27}(y, z) = (6h^2 - 5)(-y^2 - 2yz + z^2)(-y^2 + 2yz + z^2)$
$P_{28}(y, z) = 4(6h^2 - 5)y(z - y)z(z + y)$
$P_{29}(y, z) = (21h^4 - 30h^2 + 10)z(z^2 - 3y^2)$
$P_{30}(y, z) = (21h^4 - 30h^2 + 10)y(3z^2 - y^2)$
$P_{31}(y, z) = (56h^6 - 105h^4 + 60h^2 - 10)(z + y)(z - y)$
$P_{32}(y, z) = 2(56h^6 - 105h^4 + 60h^2 - 10)yz$
$P_{33}(y, z) = (126h^8 - 280h^6 + 210h^4 - 60h^2 + 5)z$
$P_{34}(y, z) = (126h^8 - 280h^6 + 210h^4 - 60h^2 + 5)y$
$P_{35}(y, z) = 252h^{10} - 630h^8 + 560h^6 - 210h^4 + 30h^2 - 1$

TABLE 2

$R = -45.28$
$C_1 = 0.$  $C_2 = -3.62736 \times 10^{-4}$
$C_3 = 1.08794 \times 10^{-4}$  $C_4 = -3.26809 \times 10^{-5}$
$C_5 = 0.$  $C_6 = 0.$
$C_7 = 5.76492 \times 10^{-5}$  $C_8 = 0.$
$C_9 = 0.$  $C_{10} = 7.68227 \times 10^{-5}$
$C_{11}$ to $C_{35} = 0.$

TABLE 3

$R = -1015.65$
$C_1 = 0.$  $C_2 = -2.76547 \times 10^{-3}$
$C_3 = -3.97336 \times 10^{-4}$  $C_4 = -6.00307 \times 10^{-3}$
$C_5 = 0.$  $C_6 = 0.$
$C_7 = 2.86173 \times 10^{-4}$  $C_8 = -6.20009 \times 10^{-5}$
$C_9 = 0.$  $C_{10} = 1.85528 \times 10^{-4}$
$C_{11} = 5.69790 \times 10^{-5}$  $C_{12} = 0.$
$C_{13} = 0.$  $C_{14} = 5.06040 \times 10^{-7}$
$C_{15} = 0.$  $C_{16} = 7.34043 \times 10^{-6}$
$C_{17} = 0.$  $C_{18} = 0.$
$C_{19} = 5.38955 \times 10^{-7}$  $C_{20} = 0.$
$C_{21} = 0.$  $C_{22} = 0.$
$C_{23} = 0.$  $C_{24} = 0.$
$C_{25} = 0.$  $C_{26} = -5.28468 \times 10^{-7}$
$C_{27}$ to $C_{35} = 0.$

TABLE 4

$R = -44.4872$
$C_1 = 0.$  $C_2 = -1.62886 \times 10^{-4}$
$C_3 = -3.18370 \times 10^{-4}$  $C_4 = -1.32386 \times 10^{-4}$
$C_5 = 0.$  $C_6 = 0.$
$C_7 = 2.75552 \times 10^{-5}$  $C_8 = -2.57167 \times 10^{-7}$
$C_9 = 0.$  $C_{10} = 1.38268 \times 10^{-5}$
$C_{11} = -5.42988 \times 10^{-7}$  $C_{12} = 0.$
$C_{13} = 0.$  $C_{14} = 0.$
$C_{15} = 0.$  $C_{16} = -6.58165 \times 10^{-7}$
$C_{17}$ to $C_{35} = 0.$

TABLE 5

$R = -102.312$
$C_1 = 0.$  $C_2 = -2.33454 \times 10^{-2}$
$C_3 = -1.91725 \times 10^{-3}$  $C_4 = -2.48900 \times 10^{-3}$
$C_5 = 0.$  $C_6 = 0.$
$C_7 = 1.75543 \times 10^{-4}$  $C_8 = -4.61173 \times 10^{-6}$
$C_9 = 0.$  $C_{10} = 2.49986 \times 10^{-4}$
$C_{11} = -4.56405 \times 10^{-6}$  $C_{12} = 0.$
$C_{13} = 0.$  $C_{14} = 0.$ TABLE 5-continued

| | |
|---|---|
| $C_{15} = 0.$ | $C_{16} = -1.06213 \times 10^{-6}$ |
| $C_{17} = 0.$ | $C_{18} = 0.$ |
| $C_{19} = -4.42025 \times 10^{-7}$ | $C_{20} = 0.$ |
| $C_{21} = 0.$ | |

TABLE 6

| | |
|---|---|
| $R = -46.1096$ | |
| $C_1 = 0.$ | $C_2 = -1.24099 \times 10^{-4}$ |
| $C_3 = 3.39675 \times 10^{-5}$ | $C_4 = 7.75597 \times 10^{-6}$ |
| $C_5 = 0.$ | $C_6 = 0.$ |
| $C_7 = 1.49735 \times 10^{-5}$ | $C_8 = 0.$ |
| $C_9 = 0.$ | $C_{10} = 1.66527 \times 10^{-5}$ |
| $C_{11}$ to $C_{35} = 0.$ | |

TABLE 7

| | |
|---|---|
| $R = -1371.74$ | |
| $C_1 = 0.$ | $C_2 = 7.56494 \times 10^{-3}$ |
| $C_3 = -2.84806 \times 10^{-3}$ | $C_4 = -1.21735 \times 10^{-3}$ |
| $C_5 = 0.$ | $C_6 = 0.$ |
| $C_7 = 1.77065 \times 10^{-4}$ | $C_8 = -2.81922 \times 10^{-6}$ |
| $C_9 = 0.$ | $C_{10} = 2.29306 \times 10^{-4}$ |
| $C_{11} = 1.76453 \times 10^{-7}$ | $C_{12} = 0.$ |
| $C_{13} = 0.$ | $C_{14} = -2.22345 \times 10^{-8}$ |
| $C_{15} = 0.$ | $C_{16} = -1.19564 \times 10^{-6}$ |
| $C_{17} = 0.$ | $C_{18} = 0.$ |
| $C_{19} = -2.82465 \times 10^{-9}$ | $C_{20} = 0.$ |
| $C_{21} = 0.$ | |

According to the present invention, as described above, there can be achieved a focus detecting apparatus in which each element of optical means for focus detection provided on the image plane side of an objective lens (a photo-taking lens) is appropriately set, whereby in any area and/or a plurality of areas in a vertical direction in a photographing field, an area in which focus detection is possible can be enlarged particularly to the upper portion in a photographing range and focus detection can be effected highly accurately also at any point in a continuous two-dimensional area, and an optical apparatus using the same.

Besides, according to the present invention, focus detection accuracy is maintained and yet the area in which focus detection is possible can be markedly enlarged. Also, focus detection is extended to a continuous two-dimensional area and it is easily possible to focus on an object at any desired position, and in the two-dimensional area wherein the degree of freedom of the setting of composition when photographing or observation is done increases, focus detection becomes possible irrespective of the direction of the density distribution of the object and thus, the frequency with which focus detection becomes impossible decreases markedly.

Focus detection is made possible in the two-dimensional area and yet optimum focus detection accuracy can be selected in conformity with the brightness of the objective lens and therefore, even for a large-aperture lens of a shallow depth, focusing becomes possible with sufficient accuracy.

Thus, there can be realized a focus detecting apparatus in which focus detection is made possible in a two-dimensional area and yet the bulkiness of a focus detecting system and the resultant high cost and increased calculating process time can be suppressed to the utmost and which can be incorporated into popular cameras and the like.

What is claimed is:

1. A focus detecting apparatus for detecting the focus state of an objective lens, comprising:

a finder optical unit for observing therethrough an image formed by said objective lens;

an optical unit for forming a pair of distributions of light quantity on the basis of light beams transmitted through the different pupils of said objective lens;

a sensor unit for receiving said pair of distributions of light quantity;

a main mirror disposed in an optical path leading to said objective lens and said optical unit for reflecting the light beam from said objective lens to said finder optical unit; and a reflecting mirror having a curved surface having its concave surface facing the light incidence side for reflecting the light beam transmitted through said main mirror in the direction of said optical unit which is opposite to said finder optical unit.

2. A focus detecting apparatus according to claim 1, wherein the reflecting surface of said reflecting mirror is of a shape which does not have a rotation symmetry axis.

3. A focus detecting apparatus according to claim 1, wherein the reflecting surface of said reflecting mirror is of a spheroidal shape.

4. A focus detecting apparatus according to claim 1, wherein said optical unit forms a plurality of pairs of distributions of light quantity.

5. A focus detecting apparatus for detecting the focus state of an objective lens, comprising:

an optical unit for forming a pair of distributions of light quantity on the basis of light beams transmitted through the different pupils of said objective lens;

a sensor unit for receiving said pair of distributions of light quantity; and a reflecting member disposed between said objective lens and said optical unit for reflecting the light beam from said objective lens so as to be directed to said optical unit, said reflecting member having a reflecting surface which does not have a rotation symmetry axis.

6. A focus detecting apparatus according to claim 5, wherein said optical unit forms a plurality of pairs of distributions of light quantity.

7. A focus detecting apparatus according to claim 5, further including a finder optical unit for observing therethrough the image formed by said objective lens, and a main mirror disposed between said objective lens and said reflecting member, said main mirror reflecting the light beam from said objective lens to said main mirror, said reflecting member reflecting the light beam from said objective lens in a direction opposite to said finder optical unit.

* * * * *

UNITED STATES PATENT AND TRADEMARK OFFICE
CERTIFICATE OF CORRECTION

PATENT NO. : 5,839,001

DATED : November 17, 1998

INVENTOR(S) : Keiji OHTAKA, et al.

It is certified that error appears in the above-identified patent and that said Letters Patent is hereby corrected as shown below:

ON THE COVER PAGE:

At [56] References Cited - OTHER PUBLICATIONS:

"Kuraska" should read --Kusaka--.

COLUMN 1:

Line 29, "phototaking" should read --photo-taking--.

COLUMN 5:

Line 33, "objectivelens" should read --objective lens--.

COLUMN 7:

Line 40, "1-k" should read --1+k--.

COLUMN 10:

Line 24, "polynominal " should read --polynomial --.
   Line 35, "bird's" should read --bird's-eye view--.

UNITED STATES PATENT AND TRADEMARK OFFICE
CERTIFICATE OF CORRECTION

PATENT NO. : 5,839,001

DATED : November 17, 1998

INVENTOR(S) : Keiji OHTAKA, et al.

It is certified that error appears in the above-identified patent and that said Letters Patent is hereby corrected as shown below:

COLUMN 16:

Line 49, "$C_2 = -1.62886 \times 10^{-4}$" should read --$C_2 = 1.62886 \times 10^{-4}$--.

COLUMN 17:

Line 6, "$C_{21} = 0.$" should read --$C_{21}$ to $C_{35} = 0.$--.
Line 27, "$C_{16} = -1.19564 \times 10^{-6}$" should read --$C_{16} = 1.19564 \times 10^{-6}$--.
Line 29, "$C_{21} = 0.$" should read --$C_{21}$ to $C_{35} = 0.$--.

Signed and Sealed this

Tenth Day of August, 1999

Q. TODD DICKINSON

*Attest:*

*Attesting Officer*        Acting Commissioner of Patents and Trademarks